(12) United States Patent
Onouchi et al.

(10) Patent No.: US 8,239,695 B2
(45) Date of Patent: Aug. 7, 2012

(54) INFORMATION PROCESSING DEVICE

(75) Inventors: Masafumi Onouchi, Tachikawa (JP); Hiroyuki Mizuno, Musashino (JP)

(73) Assignee: Hitachi, Ltd., Tokyo (JP)

(*) Notice: Subject to any disclaimer, the term of this patent is extended or adjusted under 35 U.S.C. 154(b) by 576 days.

(21) Appl. No.: 12/466,696

(22) Filed: May 15, 2009

(65) Prior Publication Data
US 2010/0083011 A1 Apr. 1, 2010

(30) Foreign Application Priority Data
Sep. 29, 2008 (JP) .................. 2008-251122

(51) Int. Cl.
*G06F 1/00* (2006.01)
(52) U.S. Cl. ...................... 713/300; 710/305
(58) Field of Classification Search .......... 713/300–340; 710/305–306
See application file for complete search history.

(56) References Cited

U.S. PATENT DOCUMENTS

| | | | |
|---|---|---|---|
| 5,008,728 A | 4/1991 | Yamamura et al. | |
| 7,165,133 B2 | 1/2007 | Takeuchi et al. | |
| 7,779,287 B2 * | 8/2010 | Lim et al. ............. | 713/500 |
| 2007/0156370 A1 * | 7/2007 | White et al. .......... | 702/132 |

FOREIGN PATENT DOCUMENTS

| | | |
|---|---|---|
| JP | 02-82552 A | 3/1990 |
| JP | 2002-049443 A | 2/2002 |
| JP | 2004-326462 A | 11/2004 |
| JP | 2006-39623 A | 2/2006 |

OTHER PUBLICATIONS

Sriram Vangal et al., "An 80-Tile 1.28 TFLOPS Network-on-Chip in 65nm CMOS", 2007 IEEE International Solid-State Circuits Conference, pp. 98-99, Feb. 2007.
Sriram Vangal et al., "An 80-Tile Sub-100-W TeraFLOPS Processor in 65-nm CMOS", IEEE Journal of Solid-State Circuits, vol. 43, No. 1, pp. 29-41, Jan. 2008.
Office Action from Japanese Patent Application No. 2008-251122 dated Apr. 17, 2012 (and English translation).

* cited by examiner

*Primary Examiner* — Brian Misiura
*Assistant Examiner* — Kim Huynh
(74) *Attorney, Agent, or Firm* — Miles & Stockbridge P.C.

(57) ABSTRACT

In a configuration provided with, for example, sixty four pieces of processor cores, an on-chip-memory, a bus commonly connected thereto, and others, the processor cores are operated by a power supply with low voltage and a clock with low frequency, and the bus is operated by a power supply with high voltage and a clock with high frequency. Each of the processor cores is provided with a bus interface and a frequency divider in order to absorb a power supply voltage difference and a frequency difference between the bus and each of them. The frequency divider generates the clock with low frequency from the clock with high frequency, and the bus interface is provided with a level shifting function, a data width converting function, a hand shaking function between the bus and the bus interface, and the like.

17 Claims, 23 Drawing Sheets

INFORMATION PROCESSING DEVICE

CROSS-REFERENCE TO RELATED APPLICATION

The present application claims priority from Japanese Patent Application No. 2008-251122 filed on Sep. 29, 2008, the content of which is hereby incorporated by reference into this application.

TECHNICAL FIELD OF THE INVENTION

The present invention relates to an information processing device, and more particularly, the present invention relates to a processing method for realizing high processing performance in a power saving manner by using a plurality of general-purpose processors or a plurality of dedicated processors.

BACKGROUND OF THE INVENTION

For example, as the method for realizing high processing performance by using the plurality of general-purpose processors or the plurality of dedicated processors, there is a technique for integrating many general-purpose processors having high processing performance. As such a technique, for example, a network chip mounting eighty pieces of processing engines (PE) is described in Non-Patent Document 1 (S. Vangal, and other thirteen, "An 80-Tile 1.28 TFLOPS Network-on-Chip in 65 nm CMOS", 2007 IEEE International Solid-State Circuits Conference Digest of Technical Papers, February 2007, p. 98-99) and Non-Patent Document 2 (S. Vangal, and other fourteen, "An 80-Tile Sub-100-W TeraFLOPS Processor in 65-nm CMOS", IEEE Journal of Solid-State Circuits, Vol. 43, No. 1, January 2008, p. 29-41). As one example, the network chip described in Non-Patent Document 2 operates at a power supply voltage of 1.07 V and a clock frequency of 4.27 GHz, and it provides processing performance of 1.0 TFLOPS with a power consumption of 97 W.

Also, Patent Document 1 (Japanese Patent Application Laid-Open publication No. 2006-39623) discloses a microcontroller which has a CPU section, a memory section, and a power supplying section supplying power supply voltage individually to circuit blocks such as a peripheral circuit, and which can vary the voltage supplied individually to the circuit blocks.

SUMMARY OF THE INVENTION

Conventionally, because of promoting a micro-fabrication of a transistor by advance of a process technique, achieving high speed of an operating frequency and saving a power by decreasing a power supply voltage have been realized. However, recently, even if the power supply voltage is decreased by micro-fabrication of a process, an increase of leakage current overcomes a decrease of switching current, and therefore, such a power scaling as used to be cannot be desired. Further, a variation of transistor performance also has been remarkable by micro-fabrication of the process, and therefore, an improvement of the operating frequency also has hit a peak. On the other hand, it becomes possible to mount several tens of pieces of processor cores on a current SoC (System-on-a-Chip) by micro-fabrication of the process, and therefore, it is expected to mount several tens to one hundred pieces of processor cores on a next-generation SoC.

Under such a background, in the above-described Non-Patent Documents 1 and 2, very high processing performance is realized by integrating eighty pieces of processor cores with high performance on one chip. However, in this method, when the processor cores are operated at high frequency (for example, a few GHz) for improving absolute performance, the power supply voltage must be set to high, and therefore, the power consumption increases, and as a result, a ratio of performance per power dissipation is largely decreased.

Specifically, as shown in FIG. 23, while the frequency (=processing performance) is improved linearly relative to the power supply voltage when the power supply voltage increases, the power consumption increases as the cube of the power supply voltage, and therefore, the ratio of performance per power dissipation (=processing performance/power dissipation) deteriorates as the square of the power supply voltage. For example, when power dissipation per performance (=TFLOPS) (W) is calculated by using a numerical value disclosed in Non-Patent Document 2, the ratio of power dissipation per performance is 0.38 when the operating frequencies of the processor core are 1 GHz and 5.67 GHz, and it is found that the power dissipation per performance in 5.67 GHz decreases to about one third of the power dissipation per performance in 1 GHz. More particularly, power dissipation of 200 W or more is consumed in the operation of 5.67 GHz, and therefore, cooling of the SoC becomes a large issue. Accordingly, in a future SoC, as well as an improvement of the processing performance, it has been important that the improvement is realized by how power is saved.

Also, in Patent Document 1, it is made possible to individually reduce the power consumption by individually reducing the supplied voltage to each of circuit blocks. However, Patent Document 1 neither describes nor suggests a configuration for improving the ratio of performance per power dissipation as reducing the power consumption.

The above and other objects and novel characteristics of the present invention will be apparent from the description of this specification and the accompanying drawings.

The typical ones of the inventions disclosed in the present application will be briefly described as follows.

That is, an information processing device according to the typical embodiment of the present invention has a first processor core including a first arithmetic section, a second processor core including a second arithmetic section, and a bus commonly connected to each of the processor cores. And, the information processing device is characterized in that, a power supply voltage higher than power supply voltages supplied to the first and second arithmetic sections is supplied to the bus, and a clock with a higher frequency than those of clocks supplied to the first and second arithmetic sections is supplied to the bus. By using such a configuration, a decrease of the processing performance in each processor cores can be compensated by high speed operation of the bus as the power consumption in the processor core is suppressed, and as a result, it is possible to realize an information processing device provided with high processing performance and high ratio of performance per power dissipation.

Such an effect obtained by typical aspects of the inventions disclosed in the present application will be briefly described as that high processing performance and high ratio of performance per power dissipation can be realized by operating many processor cores in parallel since the ratio of performance per power dissipation of the processor core can be improved.

BRIEF DESCRIPTIONS OF THE DRAWINGS

DESCRIPTIONS OF THE PREFERRED EMBODIMENTS

Figure 1:
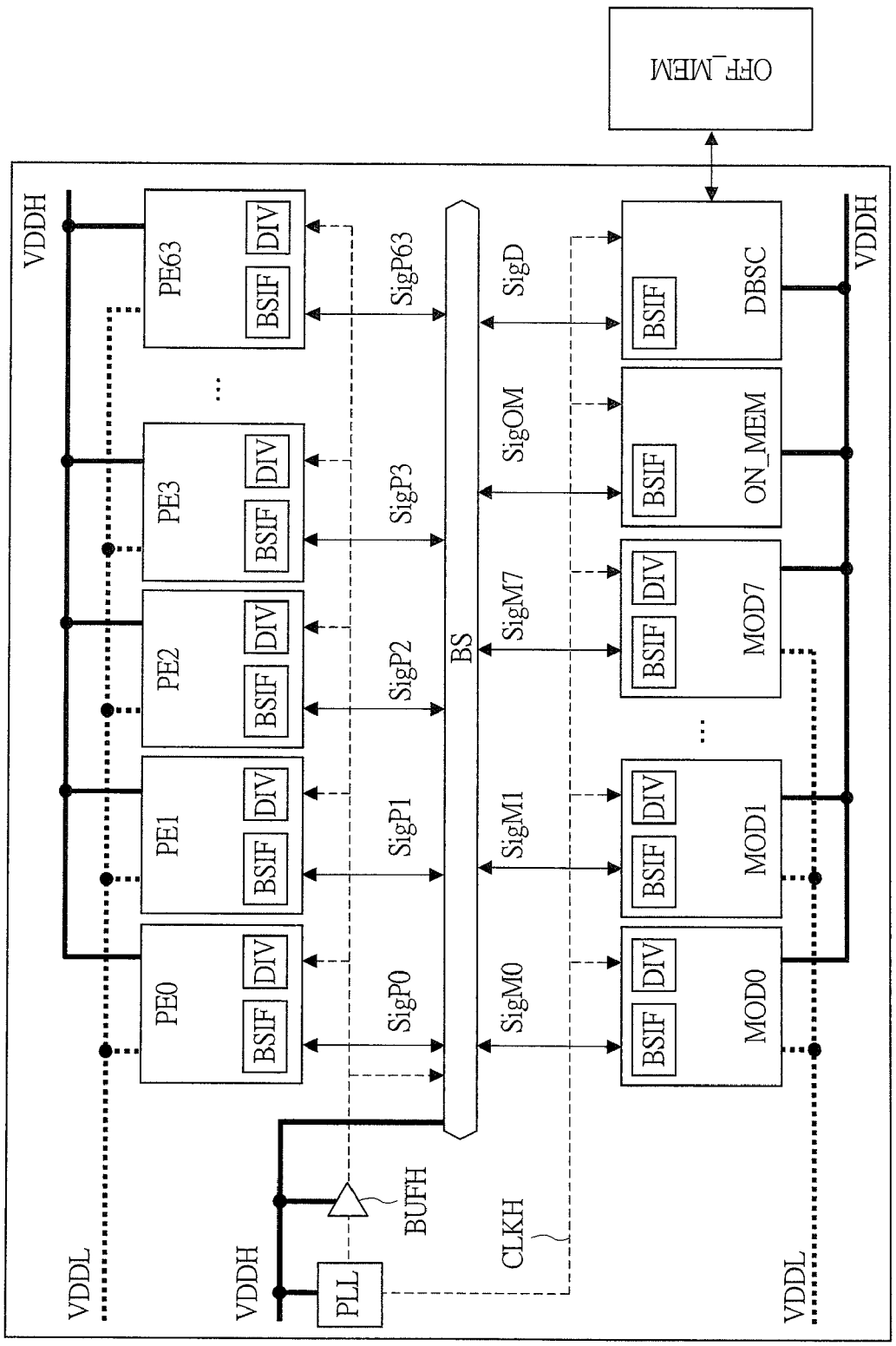
FIG. 1 is a block diagram showing one example of a configuration of an information processing device according to a first embodiment of the present invention.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it can be conceived that they are apparently excluded in principle. The same goes for the numerical value and the range described above.

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

In an information processing device according to the present embodiment, for realizing high ratio of performance per power dissipation as well as high performance, such a method is used that, a low power supply voltage is applied to many general-purpose processor cores and dedicated processor cores to be operated at low frequency, and a high power supply voltage is applied to a global clock, a bus, a memory, and an oscillating circuit such as a PLL (hereinafter, these four elements are collectively called "global system") to be operated at high frequency. By using this method, the ratio of performance per power dissipation per one processor core can be improved as the square of the power supply voltage by decreasing the power supply voltage of the processor core. Although the processing performance decreases linearly with the decrease of the frequency, the absolute performance can be ensured by operating many processor cores in parallel with regard to this. Further, in data communication with a large volume caused by operating many processor cores in parallel, its communication performance can be ensured by operating the global system at high speed.

This method utilizes a property such that a power consumed in the processor core occupies in most part and a ratio of a power consumed in the global system is small in a SoC with a general multi-processor core. Therefore, even if the global system is operated at high speed, an increase of the power consumption is relatively suppressed so that the ratio of performance per power dissipation can be improved in a view of a whole SoC. For example, as a result of trial calculation by assuming an SoC which is connected to sixty four pieces of general-purpose processor cores operating at 0.8 V by a bus operating at 1.0 V and 1 GHz, it has been found that, when the operation frequency of the general-purpose processor core is improved from 10 MHz to 20, 40, and 80 MHz, an increasing amount of its power dissipation becomes 3, 9, and 20%, and the ratio of performance per power dissipation is improved to 1.94, 3.68, and 6.66 times. Hereinafter, a more specific configuration example of an information processing device applying this method and the like will be explained.

FIG. 1 is a block diagram showing one example of a configuration of an information processing device according to the first embodiment of the present invention. In FIG. 1, main IP (Intellectual Property) on a SoC is shown by a block, a signal line is shown by a solid line, a clock is shown by a dotted line, and a power supply is shown by a thick line. The information processing device (SoC) shown in FIG. 1 are provided as an example of the main IP with general-purpose (or dedicated) processor cores PE0 to PE63, a bus BS, an oscillating circuit PLL, other modules MOD0 to MOD7, an on-chip-memory ON_MEM, a memory controller DBSC, a buffer circuit for high voltage signal BUFH, and the like. The DBSC is connected to an off-chip-memory OFF_MEM. Each of PE0 to PE63, MOD0 to MOD7, ON_MEM, and DBSC are configured so as to include a bus interface BSIF, a frequency divider DIV, and the like. Note that, although sixty four pieces of PE and eight pieces of MOD are described here for descriptive purpose, the number of pieces may be any number of zero, or one or more.

PE0 to PE63, MOD0 to MOD7, ON_MEM, and DBSC are connected to BS via signals lines SigP0 to SigP63, SigM0 to SigM7, SigOM, and SigD, respectively. Note that, although each of these signal lines is represented by one signal line for descriptive purpose, the signal line may be zero, or one or more line. A clock with high voltage and high frequency CLKH is distributed from PLL to each IP by the buffer circuit BUFH. Note that, although only one BUFH is described as a representative here for simplification, there may be any number of BUFH on a propagation path of CLKH. High power supply voltage HDDH is applied to PLL, BS, ON_MEM, and DBSC to operate at high voltage and high frequency. On the other hand, both of the high power supply voltage VDDH and a low power supply voltage VDDL are applied to PE0 to PE63 and MOD0 to MOD7. VDDL is supplied to PE0 to PE63 and MOD0 to MOD7 in additional to BSIF and DIV which are inside to operate at low voltage and low frequency as described later. Both of VDDH and VDDL are supplied to BSIF and DIV to mediate between blocks operating at different voltages and frequencies. Hereinafter, a block for mediating between blocks operating at different voltages and frequencies is referred to as "interface section", and BSIF and DIV correspond to the interface section BIC in the present embodiment. Here, in the respective power supply voltages, for example, VDDH is in a range from 1.0 V to 1.2 V and VDDL is in a range from 0.6 V to 0.8 V.

Figure 2:
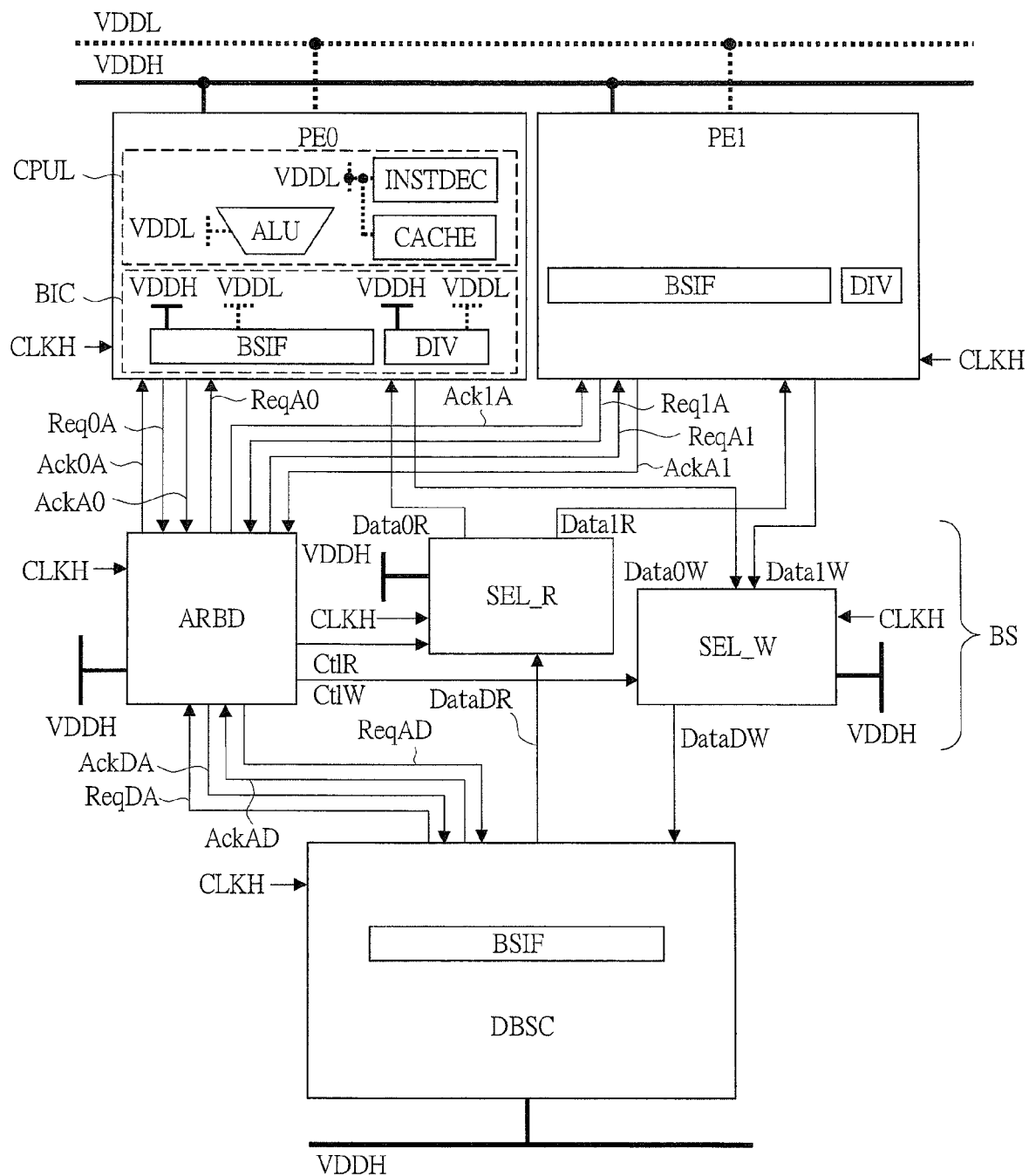
FIG. 2 is a block diagram showing a specific configuration example in peripheral of IP of the information processing device shown in FIG. 1.

FIG. 2 is shows in more detail a wire connection state in peripheral of IP by extracting a part of FIG. 1. In FIG. 2, PE0, PE1, an arbitration block for a memory ARBD, a memory read signal selecting block SEL_R, a memory write signal selecting block SEL_W, and DBSC are shown as IP, and ARBD, SEL_R, and SEL_W among them correspond to BS in FIG. 1. Further, only inside of PE0 is described in detail as a representative for explaining a wire connection for power supply inside of PE. Here, although an arithmetic unit ALU, an instruction decoder INSTDEC, and a cache CACHE are described as representatives of many constituent elements, PE0 may be configured with elements except for these constituent elements. A group of these circuits actually performs arithmetic operation inside of PE. Hereinafter, the circuit group actually performing arithmetic operation in this manner is referred to as "arithmetic section CPUL".

Voltages supplied to the inside of PE0 are two types of VDDL and VDDH, and the two types of VDDL and VDDH are supplied to BSIF and DIV for performing frequency conversion and level conversion. And, only VDDL is supplied to ALU, INSTDEC, CACHE, and the like except for BSIF and DIV for operating at low frequency (clock CLKL not shown in Figure). Also, although three examples of PE0, PE1, and DBSC are explained in this example, of course three or more pieces of PE can be used, and MOD or another PE may be used instead of DBSC. VDDH is supplied to ARBD, SEL_R, SEL_W, and DBSC to operate at high voltage and high frequency. On the other hand, both of VDDH and VDDL are supplied to PE0 and PE1, and the other sections except for BSIF and DIV operate at low voltage and low frequency. BSIF and DIV mediate between blocks operating at different voltage amplitudes and different frequencies. Although the power supply voltages are limited to two types of VDDH and VDDL and the clocks are limited to two types of CLKH and CLKL in the above explanation, three or more types of power supply and clocks can be used in combination. In that case, a power supply with the highest voltage and a clock with the highest frequency are desired to be supplied to the bus BS. This is why high stability and high performance of communication can be realized by supplying a power supply with the highest voltage and a clock with the highest frequency to the bus BS since the bus BS is a circuit to which a highest load is applied.

As described above, the information processing device according to this embodiment is characterized in that a power supply with higher voltage and a clock with higher frequency than that of the arithmetic section CPUL are supplied to the bus BS and the interface section BIC. This configuration has a significant effect that the ratio of performance per power dissipation can be improved as power consumption is reduced by a different method from the above-described Patent Document 1. The details will be described below.

As described above, when the power supply voltage increases, the ratio of performance per power dissipation deteriorates as the square of the voltage with the increase. On the contrary, it is possible to improve the ratio of performance per power dissipation as the square of the voltage by reducing the voltage. Therefore, it is considerably effective to reduce the supplied voltage in order to reduce the power consumption. However, the reduction of the supplied voltage also causes a decrease of the arithmetic performance. Therefore, in Patent Document 1, a high arithmetic performance is realized by raising the supplied voltage in operation and decreasing the supplied voltage in standby state. However, in this method, a reduction of the power consumption to the processor core in operation cannot be expected.

On the contrary to this, in the first embodiment, power consumptions in individual processor cores are reduced by supplying, to the arithmetic section CPUL, a lower voltage and a clock with lower frequency than those of the bus BS and the interface section BIC, and the arithmetic performance as the whole SoC is improved by connecting a plurality of processor cores to the bus BS in parallel. Thereby, it is made possible to significantly improve the above-described ratio of performance per power dissipation. That is, the ratio of performance per power dissipation can be improved by reducing the supplied voltage as increasing the number of pieces of processor instead of increasing the arithmetic performances of the individual processors as increasing the supplied voltage.

Here, it is not possible to reduce the supplied voltage and the clock frequency to all of the constituent elements. More particularly, in the global system including the bus BS, the interface section BIC, and the like, assurance of communication performance leads to performance improvement by supplying a power supply with high voltage and a clock with high frequency because of a point that a load with a large volume due to a plurality of processor cores is applied and a point that performance is deteriorated due to a reduction of a communication speed between processors. On the contrary to this, in the conventional SoC of a multi-core processor, the performance can be assured by increasing the number of pieces of processor core as described above since the power consumption in the processor core occupies in most part, and therefore, it is made possible to significantly reduce the power consumption by setting the power supply in the processor core to low voltage and setting the clock to low frequency. Because of such a reason, the information processing device according to the present embodiment has a configuration in which the power supply with higher voltage and the clock with higher frequency than that of the arithmetic section CPUL are supplied to the bus BS and the interface section BIC.

In FIG. 2, PE0 and ARBD are connected therebetween by a request signal (including an address signal) Req0A from PE0 to ARBD, an acknowledge signal Ack0A corresponding to Req0A, a request signal (including an address signal) ReqA0 from ARBD to PE0, and an acknowledge signal AckA0 corresponding to ReqA0. PE1 and ARBD are connected therebetween by a request signal (including an address signal) Req1A from PE1 to ARBD, an acknowledge signal Ack1A corresponding to Req1A, a request signal (including an address signal) ReqA1 from ARBD to PE1, and an acknowledge signal AckA1 corresponding to ReqA1. PE0 and SEL_R are connected therebetween by a data signal Data0R, and PE1 and SEL_R are connected therebetween by a data signal Data1R, respectively. PE0 and SEL_W are connected therebetween by a data signal Data0W, and PE1 and SEL_W are connected therebetween by a data signal Data1W, respectively.

ARBD and DBSC are connected therebetween by a request signal (including an address signal) ReqAD from ARBD to DBSC, an acknowledge signal AckAD corresponding to ReqAD, a request signal (including an address signal) eqDA from DBSC to ARBD, and an acknowledge signal AckDA corresponding to ReqDA. ARBD and SEL_R are connected therebetween by a read control signal Ct1R, and ARBD and SEL_W are connected therebetween by a write control signal Ct1W, respectively. SEL_R and DBSC are connected therebetween by a data signal DataDR, and SEL_W and DBSC are connected therebetween by a data signal DataDW, respectively. Here, although each signal line is represented by one line for descriptive purpose, it may be configured with a plurality of lines. Also, in FIG. 2, although one DBSC corresponds to two pieces of PE for simplification, PE and DBSC may have an arbitrary configuration to take a ratio of m to n.

Figure 3:
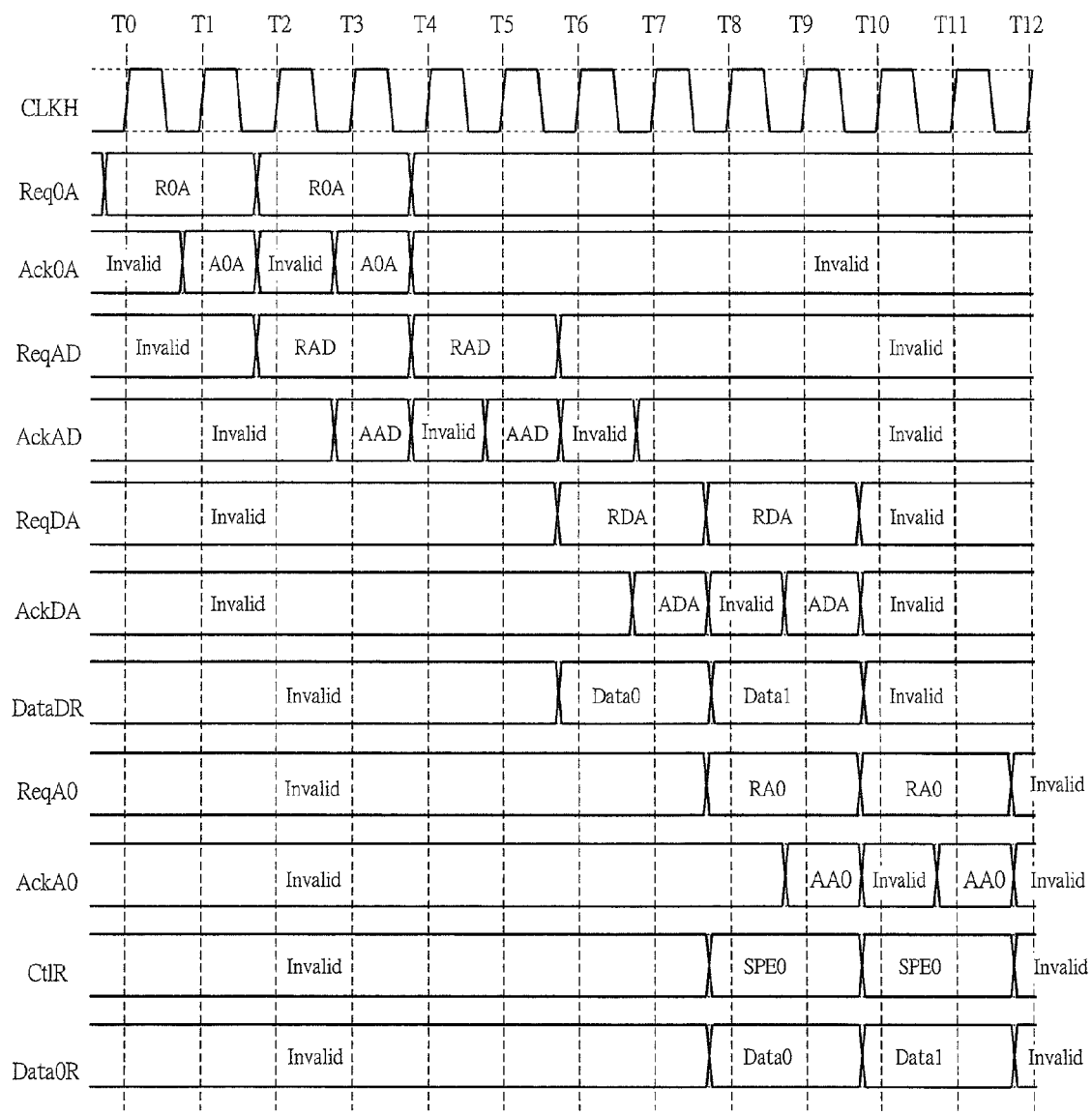
FIG. 3 is a waveform diagram showing an operation example shown in FIG. 2.

FIG. 3 shows an operation waveform when a read request is issued from PE0 to DBSC as a first operation example shown in FIG. 2. When it is assumed that the read request and the address are issued from PE0 to DBSC at time T0 of CLKH driven at high amplitude and high frequency, Req0A changes from an Invalid state to a read instruction R0A at time T0. ARBD receives R0A and returns an acknowledge signal unless it receives a read request from another section, and Ack0A changes from Invalid to an acknowledge instruction A0A at time T1. Subsequently, ARBD issues the read request and the address to DBSC, and ReqAD changes to a read instruction RAD at time T2. DBSC receives RAD and returns an acknowledge signal unless it receives a request from another section, and AckAD changes from Invalid to an acknowledge instruction AAD at time T3.

Next, DBSC performs a read operation to OFF_MEM in response to the address issued by the read request (in this example, it is assumed that two clocks are required), and it issues a read result notice request instruction RDA to ARBD at a time point when the corresponding data are obtained, and it outputs a read result Data0 to DataDR at the same time.

Therefore, ReqDA changes from Invalid to RDA and DataDR changes from Invalid to Data0 at time T6. ARBD receives RDA and it returns an acknowledge signal ADA unless it receives a request from another section to store DataDR in a buffer inside of SEL_R. At this time, AckDA changes from Invalid to ADA at time T7.

Subsequently, ARBD issues a read result notice request instruction RA0 to PE0, and it changes Ct1R to SPE0 in order to connect DBSC and PE0 to each other to output Data0 previously stored in Data0R. At this time, ReqA0 changes from Invalid to RA0, Ct1R changes from Invalid to SPE0, and Data0R changes from Invalid to Data0 at time T8. Thereafter, this operation is repeated until read of a data amount required by PE0 is completed. In an example shown in FIG. 3, two read operations including Data0 and Data1 are performed.

Figure 4:
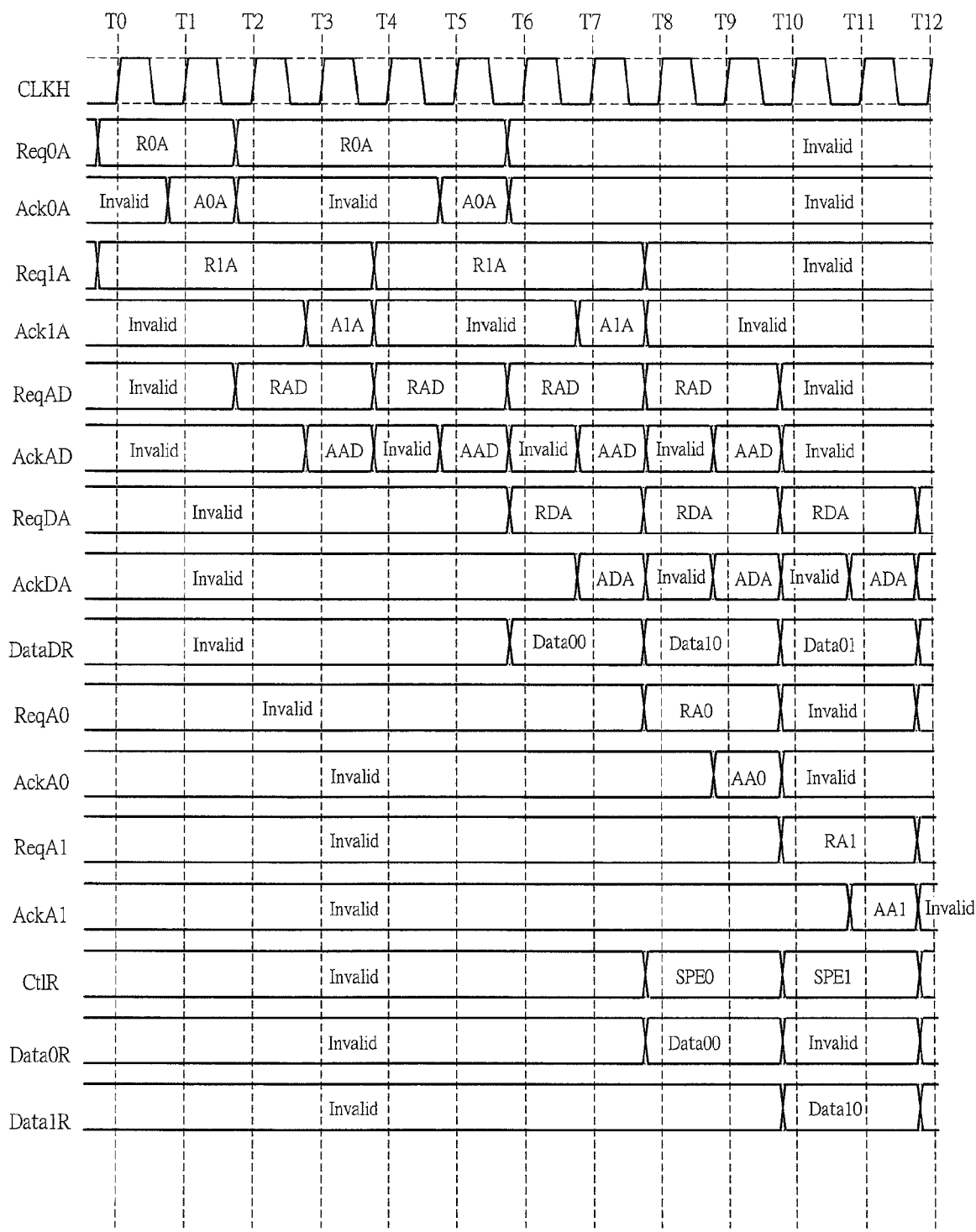
FIG. 4 is a waveform diagram showing another operation example shown in FIG. 2.

FIG. 4 shows an operation waveform when read requests are issued from PE0 and PE1 to DBSC at the same time as a second operation example shown in FIG. 2. When it is assumed that read requests and addresses are issued from PE0 and PE1 to DBSC at time T0 of CLKH which is driven at high amplitude and high frequency, Req0A changes from Invalid state to a read instruction R0A and Req1A changes from Invalid state to a read instruction R1A at time T0. Since ARBD receives R0A and R1A at the same time, it alternately permits the read operation to, for example, PE0 and PE1 based on a scheduling policy. The scheduling policy can be determined in advance or can be changed dynamically. In this example, the acknowledge signal is returned to PE0 at time T1 and the acknowledge signal is returned to PE1 at time T3, and Ack0A changes from Invalid to the acknowledge instruction A0A at time T1 and Ack1A changes from Invalid to the acknowledge instruction A1A at time T3.

Subsequently, since ARBD continuously issues read requests and addresses of PE0 and PE1 to DBSC, ReqAD changes to a read instruction RAD reflecting to a read request instruction from PE0 at time T2, it changes to a read instruction RAD reflecting to a read request instruction of PE1 at time T4, it changes to a read instruction RAD reflecting to a read request instruction of PE0 at time T6 again, and it changes to a read instruction RAD reflecting to a read request instruction of PE1 at time T8. Since DBSC receives RAD and it returns an acknowledge signal unless it receives a request from another section, AckAD changes from Invalid to an acknowledge instruction AAD corresponding to the read request instruction from PE0 at time T3, it changes to an acknowledge instruction AAD corresponding to the read request instruction from PE1 at time T5, it changes to an acknowledge instruction AAD corresponding to the read request instruction from PE0 at time T7, and it changes to an acknowledge instruction AAD corresponding to the read request instruction from PE1 at time T9 in a sequential manner.

DBSC performs the read operation to OFF_MEM in response to the address issued by the read request (in this example, it is assumed that two clocks are required), and it issues the read result notice request instruction RDA to ARBD at a time point when the corresponding data are obtained, and it outputs a read result Data0 to DataDR at the same time. Here, ReqDA changes from Invalid to RDA corresponding to the read request instruction from PE0, and DataDR changes from Invalid to Data00 at time T6, ReqDA changes to RDA corresponding to the read request instruction from PE1 and DataDR changes to Data10 at time T8, and ReqDA changes to RDA corresponding to the read request instruction from PE0 and DataDR changes to Data01 at time T10 in a sequential manner.

ARBD receives RDA and it returns an acknowledge signal ADA unless it receives a request from another section to store DataDR in a buffer inside of SEL_R. At this time, AckDA changes from Invalid to ADA at time T7, it changes from Invalid to ADA at time T9, and it changes from Invalid to ADA at time T11 in a sequential manner. Subsequently, ARBD continuously issues read result notice request instructions AA0 and AA1 to PE0 and PE1, and it continuously changes Ct1R to SPE0 and SPE1 in order to continuously connect DBSC and PE0, DBSC and PE1 to each other to output Data00 and Data10 previously stored in Data0R and Data1R in a sequential manner. At this time, ReqA0 changes from Invalid to RA0, Ct1R changes from Invalid to SPE0, and Data0R changes from Invalid to Data00 at time T8, and ReqA1 changes from Invalid to RA1, Ct1R changes to SPE1, and Data1R changes from Invalid to Data10 at time T10. Thereafter, this operation is repeated until read of a data amount required by PE0 and PE1 is completed.

Figure 5:
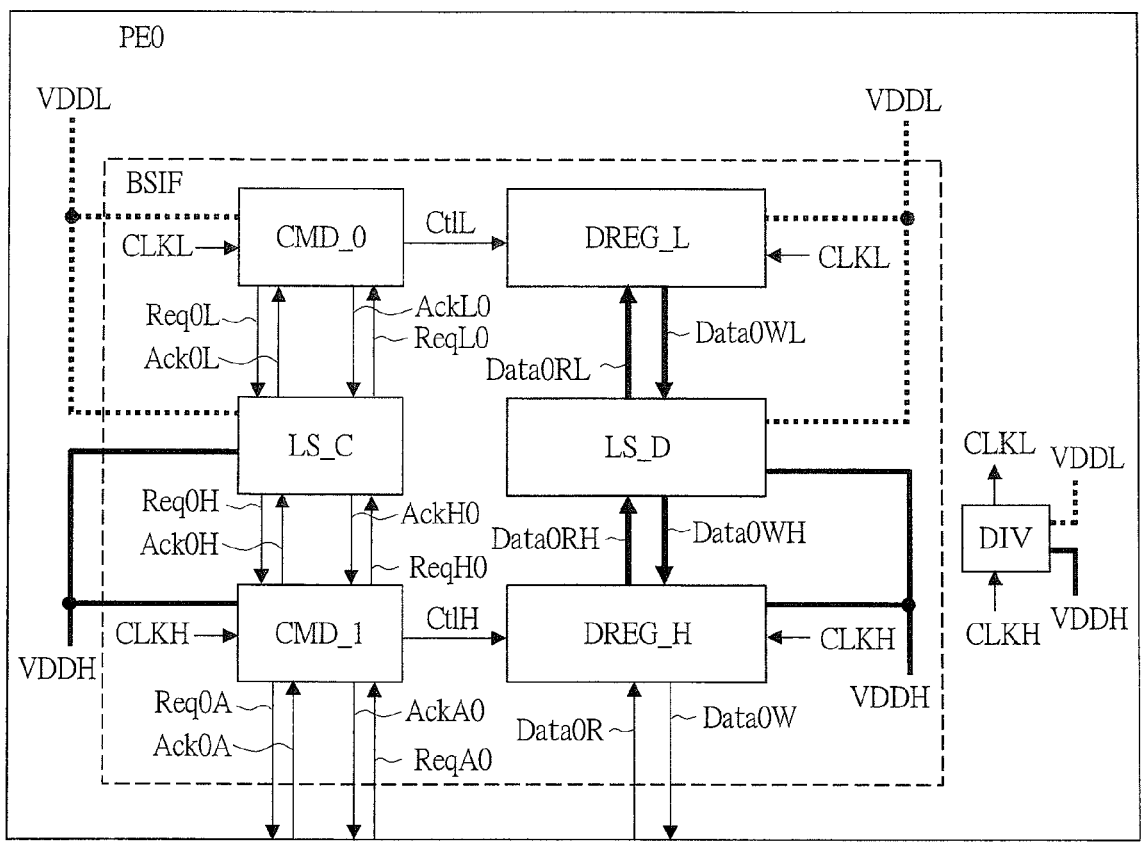
FIG. 5 is a block diagram showing a specific configuration example of a processor core of the information processing device shown in FIG. 1 or FIG. 2.

FIG. 5 shows a configuration example of the processor core PE shown in FIG. 1 or FIG. 2. Although PE0 is herein explained as an example, PE except for PE0 or MOD has a similar configuration. Also, in modules configuring PE0, general modules such as an arithmetic unit or a cache are not shown for simplification, and only provided modules according to the embodiment are shown. PE0 shown in FIG. 5 includes command generating blocks CMD_0 and CMD_1, data registers DREG_L and DREG_H, level shifters LS_C and LS_D, and a frequency divider DIV as modules. Here, the command generating blocks, the data registers, and the level shifters configure a bus interface BSIF in FIG. 1 or FIG. 2.

A low voltage power supply VDDL is supplied to CMD_0 and DREG_L to operate in synchronization with a clock with low amplitude and low frequency CLKL. CMD_0 outputs a control signal for a data latch Ct1L to DREG_L. A high voltage power supply VDDH is supplied to CMD_1 and DREG_H to operate in synchronization with a clock with high amplitude and high frequency CLKH. CMD_1 outputs a control signal for a data latch Ct1H to DREG_H. Both of VDDL and VDDH are supplied to LS_C and LS_D to perform the level conversion between modules operating at different amplitudes. Also, both of VDDL and VDDH is supplied to DIV to perform the frequency conversion from the clock with high frequency CLKH to the clock with low frequency CLKL in additional to provide the above-described level conversion.

CMD_0 and LS_C are connected therebetween by a request signal (including an address signal) Req0L from CMD_0 to LS_C, an acknowledge signal Ack0L corresponding to Req0L, a request signal (including an address signal) ReqL0 from LS_C to CMD_0, and an acknowledge signal AckL0 corresponding to ReqL0. LS_C and CMD_1 are connected therebetween by a request signal (including an address signal) Req0H from LS_C to CMD_1, an acknowledge signal Ack0H corresponding to Req0H, a request signal (including an address signal) ReqH0 from CMD_1 to LS_C, and an acknowledge signal AckH0 corresponding to ReqH0. DREG_L and LS_D are connected therebetween by data input/output signals Data0RL and Data0WL. LS_D and DREG_H are connected therebetween by data input/output signals Data0RH and Data0WH. Signals Req0A, Ack0A, ReqA0, AckA0, Data0R, and Data0W connecting CMD_1 and DREG_H to the bus BS are same signals described in FIG. 2. The clock with high amplitude and high frequency CLKH and the clock with low amplitude and low frequency CLKL are connected to DIV.

Req0L, Ack0L, ReqL0, AckL0, Data0RL, Data0WL, Req0H, Ack0H, ReqH0, AckH0, Data0RH, and Data0WH of the signals described above operate at low frequency. Also, Req0A, Ack0A, ReqA0, AckA0, Data0R, and Data0W operate at high frequency. Here, for absorbing a difference between frequencies, Data0RL, Data0WL, Data0RH, and Data0WH are configured with a wide bit width of, for example, 512 bits or the like, and Data0R and Data0W are configured with a narrow bit width of 128 bits or the like. Note that, although each of these signal lines is represented by one line for descriptive purpose, it can be zero, or one or more line.

As described above, in the configuration example shown in FIG. 5, the data register DREG_H is connected to the bus BS by Data0R and Data0W having the narrow bit width, and it is connected to the data register DREG_L by Data0RH, Data0RL, Data0WH, and Data 0WL having the wider bit width. And, as described later in FIG. 6, the data register DREG_H stores a plurality of pieces of communication data between itself and the bus, and it can communicate with the data register DREG_L. With this configuration, even if the arithmetic section CPUL and the interface section BIC, and the arithmetic section CPUL and the bus BS are different in operation frequency, the difference of the operation frequency is absorbed, so that normal communication can be established. Further, even if the arithmetic section CPUL and the interface section BIC, the arithmetic section CPUL and the bus BS are different in operation voltage, the difference can be absorbed by the level shifters LS_C and LS_D, so that normal communication can be established.

Therefore, based on the configuration shown in FIG. 5, it is possible to realize a configuration in which the arithmetic section CPUL and the interface section BIC, and the arithmetic section CPUL and the bus BS are different in operation frequency and in power supply voltage.

Here, when a width difference between a bit width (defined as a natural number "n") of Data0R and Data0W and a bit width (defined as a natural number "m") of Data0RH, Data0RL, Data0WH, and Data0WL satisfies n<m, they are not limited to a specific number. However, it is more preferable that "m" is the integral multiple of "n". This is why a data amount equal to the bit width "m" between DREG_H and DREG_L can be stored by a communication more than once between the bus BS and DREG_H, so that the communication can be effectively established.

Further, since CMD_1 operates at high frequency CLKH, it is made possible to receive Ack0A and ReqA0 transmitted from the bus at high speed in synchronization with CLKH when the communication more than once are established for data storage. Therefore, communication of Data0R or Data0W can be established at high speed.

Figure 6:
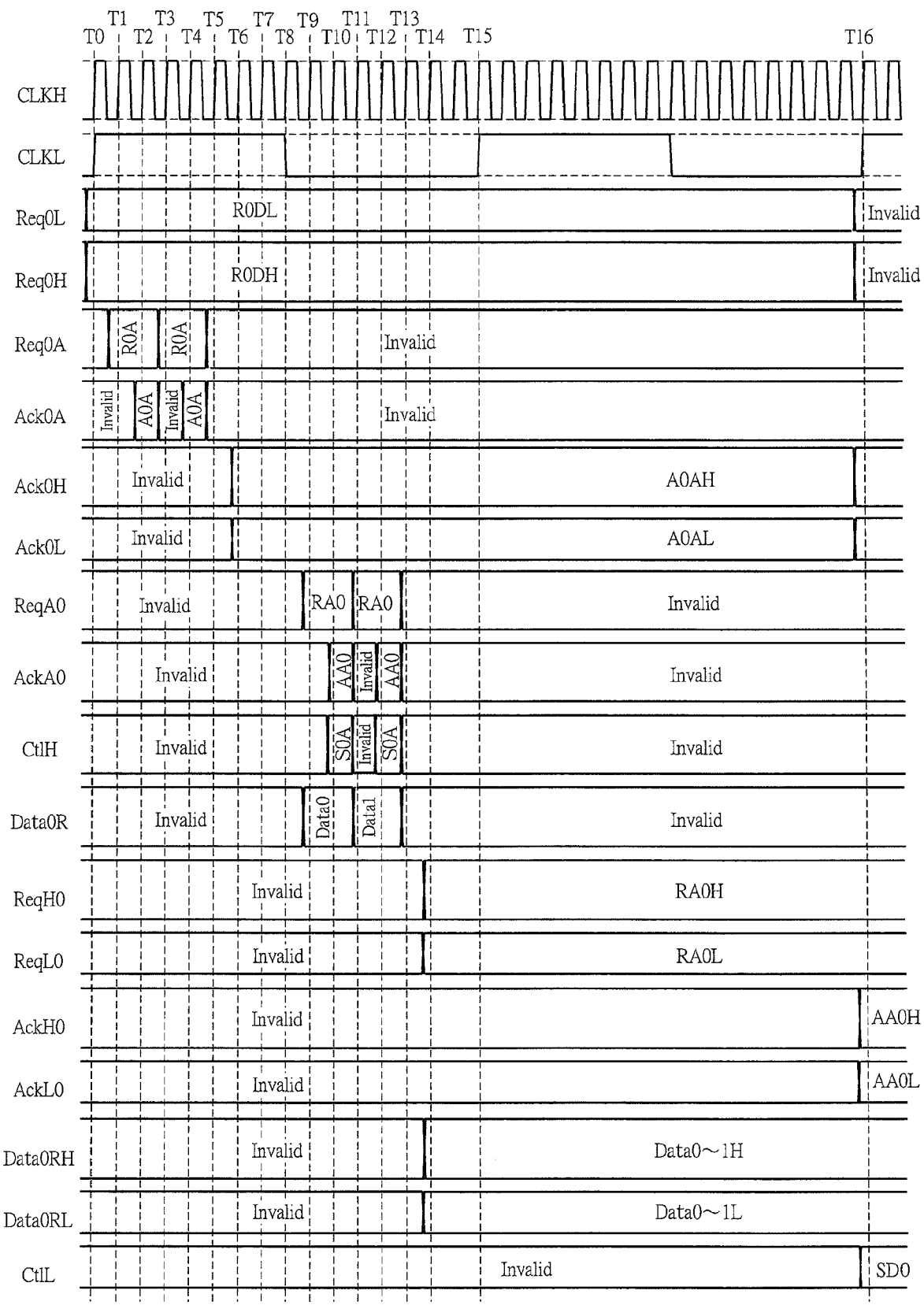
FIG. 6 is a waveform diagram showing an operation example shown in FIG. 5.

FIG. 6 shows an operation waveform when a read request is issued from PE0 to DBSC as an operation example shown in FIG. 5. A frequency ratio of a clock CLKH operating at high amplitude and high frequency to a clock CLKL operating at low amplitude and low frequency is set to 16:1. First, when it is assumed that a read request instruction is issued from CMD_0 to CMD_1, Req0L changes from Invalid to a read request instruction R0DL at time T0, and it is converted to the same read request instruction R0DH in high level after passing through LS_C. CMD_1 receives R0DH, and it issues the read request instruction to the bus. Here, when it is assumed that R0DH (R0DL) is a read instruction of 256 bits and the data width of the bus is 128 bits, the read access instruction R0A is issued twice to the bus with R0DH (R0DL). A module inside of the bus returns an acknowledge signal A0A corresponding to R0A. Here, it is assumed that A0A is returned after one clock. Therefore, Req0A changes from Invalid to R0A at time T1, and R0A is issued at time T3 again. Ack0A changes from Invalid to A0A at time T2 and it changes from Invalid to A0A at time T4 again.

Here, since the issue of R0A is completed twice, the acknowledge instruction A0AH is returned back to Ack0H. A0AH is converted to the same acknowledge instruction A0AL of low amplitude by LS_C. Therefore, Ack0H changes from Invalid to A0AH at time T6, and Ack0L also changes to A0AL with the change. When certain number of times of clock passes after the issue of R0A (here, after 8 clocks), a request instruction RA0 noticing a result of the read access is continuously (here, twice) issued to ReqA0 from the bus, and at the same time, Data0R continuously changes from a read result Data0 to Data1. In response to this, CMD_1 sequentially (here, twice) outputs the acknowledge instruction AA0 to AckA0, and sequentially (here, twice) issues a data acquiring instruction S0A to DREG_H. Thereby, for example, data of 128 bits are acquired to DREG_H twice, so that the data is collected as data of 256 bits.

In the above-described example, although data of 128 bits are collected as data of 256 bits by the two communications, the number of times of communications is not limited to twice. The example is characterized in that data are stored by the communication more than once between the bus and DREG_H to establish the communication with a bit width between DREG_H and DREG_L, so that a difference between operation frequencies can be absorbed.

Since the read request instruction issued from CMD_0 has been completed up to here, CMD_1 issues a result notice instruction RA0H of the read request toward CMD_0 as a request signal ReqH0 in response to the same instruction. At the same time, DREG_H outputs data Data1 to 1H obtained by collecting Data0 and Data1 described above toward DREG_L. RA0H is converted into the same instruction RA0L by LS_C, and Data0 to 1H are converted into Data0 to 1L of low amplitude by LS_D. When CMD_0 receives RA0L, it returns an acknowledge instruction AA0L corresponding to the same instruction and it issues a data acquiring control signal SD0 as Ct1L toward DREG_L. Thereby, read Data0 and Data1 are stored in DREG_L.

By realizing the abovementioned operation, in a view from PE0 (CMD_0) operating at CLKL, the read request result notice (RA0L) is returned after one clock from the issue of the read request instruction (R0DL), and then, data requiring the request is stored after another clock. Here, Data0 to 1H and Data0 to 1L are transmitted in synchronization with CLKH (T14 and the like). On the other hand, the signal receiving side receives these data in synchronization with CLKL (T15 and the like).

Note that, here, although the operation is described when the read request is issued from PE0 to DBSC, when a write request is issued from PE0 to DBSC, flow of data is reversed. However, the operation is almost similar to FIG. 6. This will be described briefly. First, in PE0, after data to be written is stored in DREG_L, a write request instruction is issued as a request signal Req0L. The data of the DREG_L is subjected to the level conversion to be transmitted to DREG_H. Thereafter, in PE0, as properly performing handshakes (transmission and reception of a request instruction and an acknowledge instruction) between CMD_0 and CMD_1 and between CMD_1 and the bus, at a stage when the use right of the bus is obtained, data of DREG_H is sequentially transmitted toward the bus at a period of CLKH by dividing the data of DREG_H into each bit width of the bus. The data are sequentially written in the off-chip-memory OFF_MEM as receiving the control of DBSC.

Figure 7:
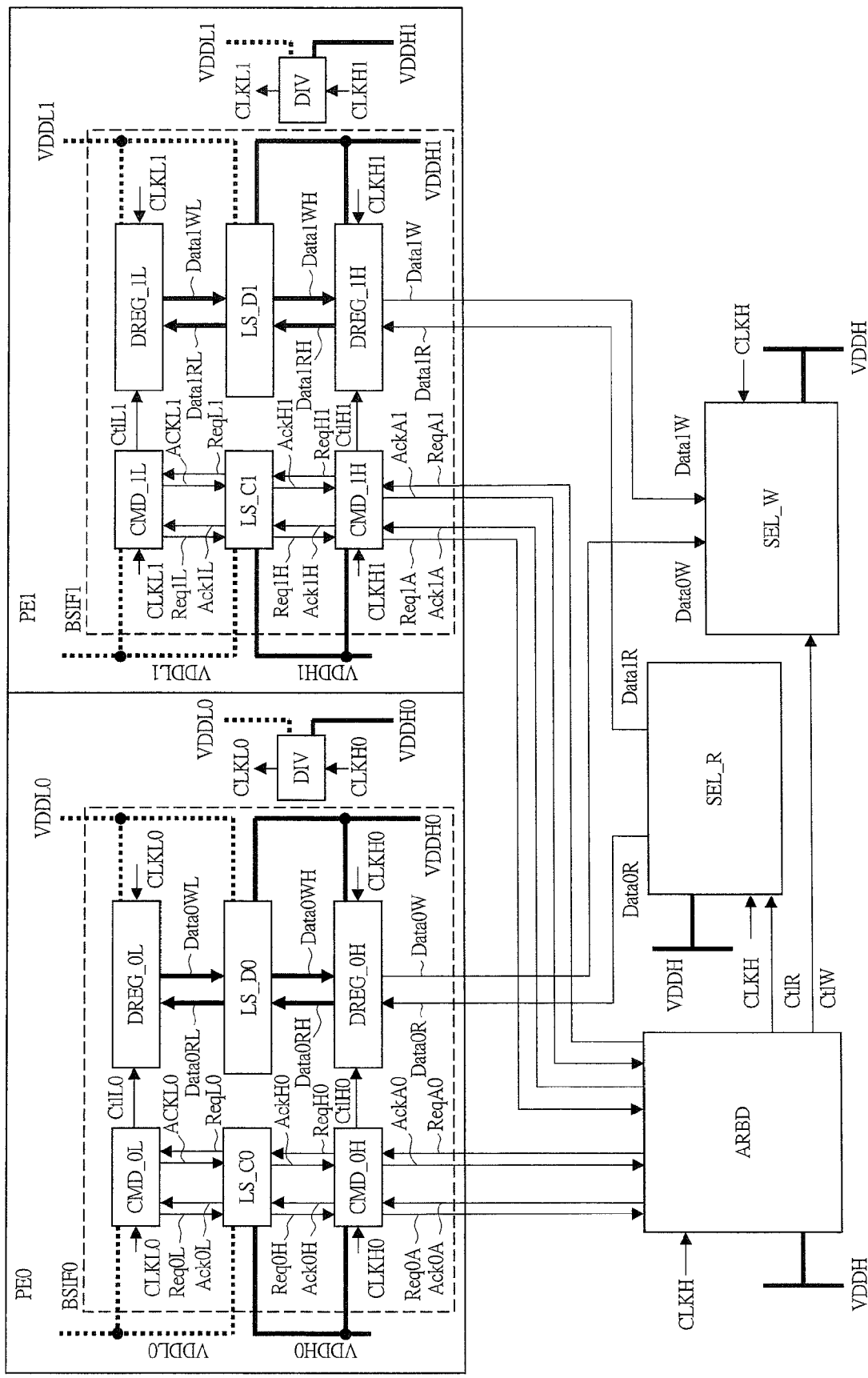
FIG. 7 is a block diagram showing a specific configuration example of a processor core of the information processing device shown in FIG. 2.

FIG. 7 shows a configuration example of PE0, PE1, ARBD, SEL_R, and SEL_W shown in FIG. 2 in more detail. PE0 and PE1 have the same configurations with PE0 shown in FIG. 5, and wire connections between PE0, PE1 and ARBD, SEL_R, and SEL_W are similar to those shown in FIG. 2.

Figure 8:
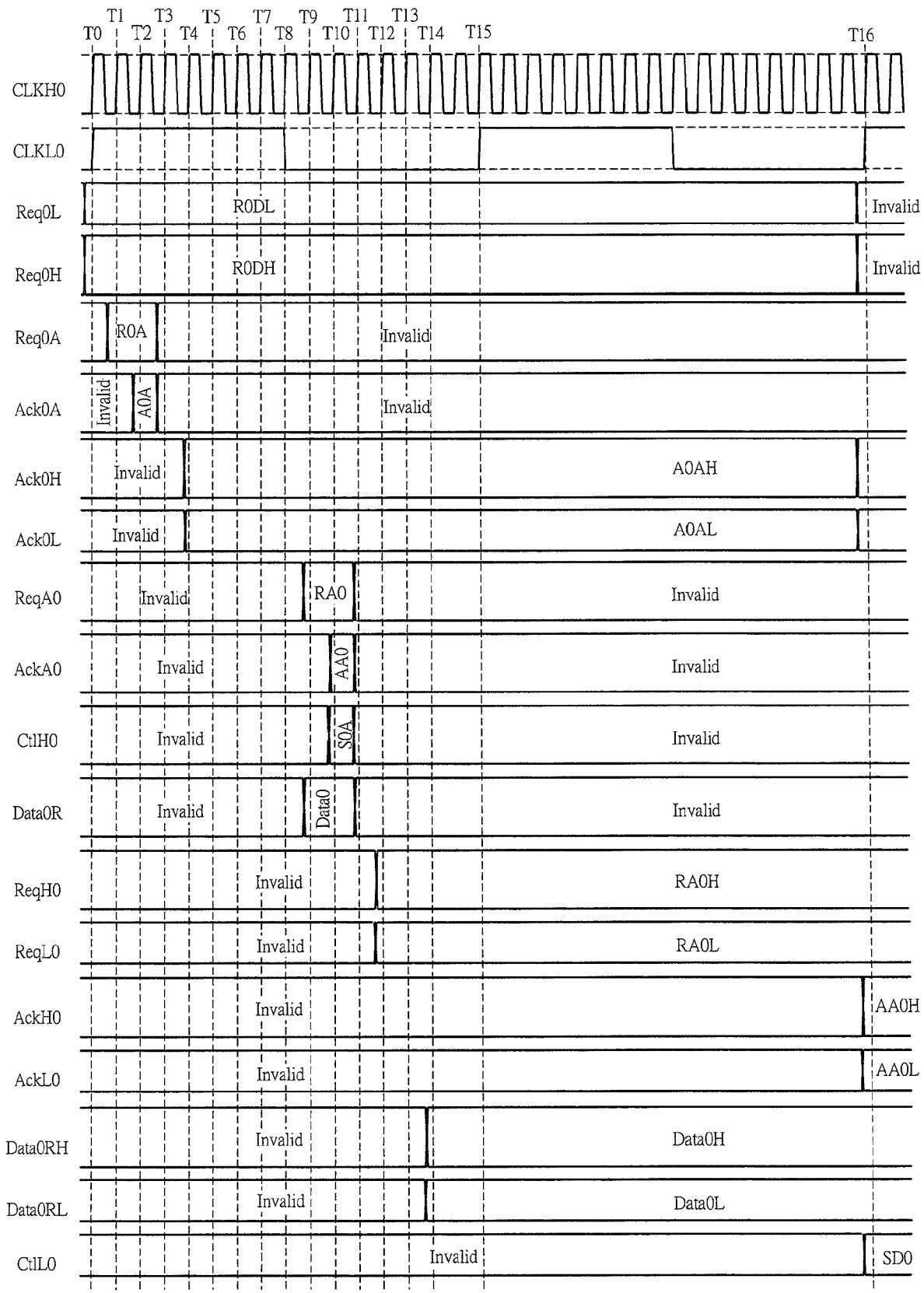
FIG. 8 is a waveform diagram showing an operation example shown in FIG. 7.
Figure 9:
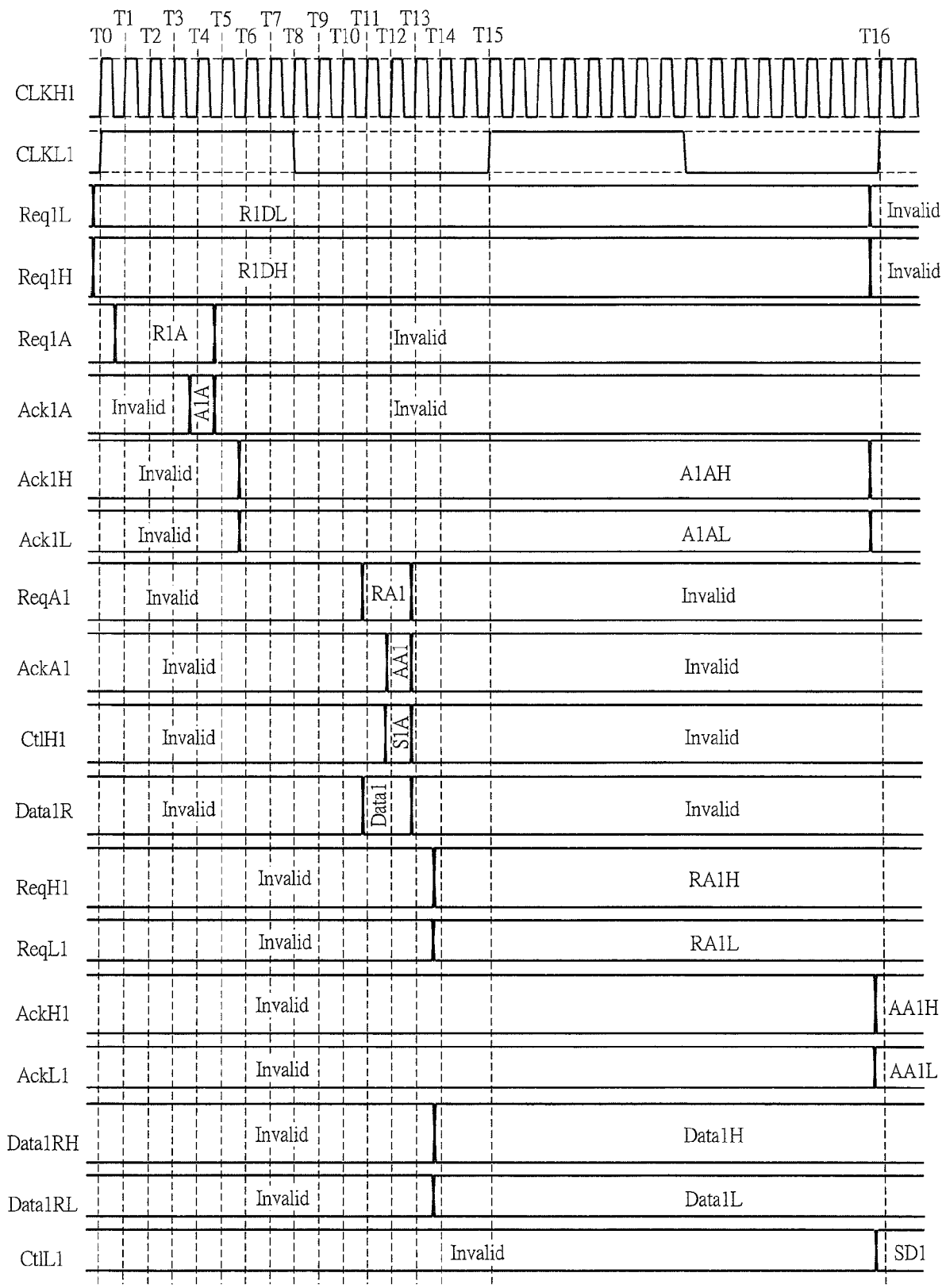
FIG. 9 is a waveform diagram showing an operation example shown in FIG. 7.

FIGS. 8 and 9 show operation waveforms when read requests are issued from PE0 and PE1 to DBSC at the same time as operation examples of FIG. 7. A frequency ratio of the clock CLKH operating at high amplitude and high frequency to the clock CLKL operating at low amplitude and low frequency is set to 16:1 similar to FIG. 5. In FIG. 8, first, when it is assumed that a read request instruction is issued from CMD_0L to CMD_0H in PE0, Req0L changes from Invalid to a read request instruction R0DL at time T0, and it is converted into the same read request instruction R0DH in high level after passing through LS_C0. When CMD_0H receives R0DH, it issues a read request instruction to the bus. Here, when it is assumed that R0DH (R0DL) is a read instruction of 128 bits and the data width of the bus is 128 bits, a read access instruction R0A is issued once to the bus with R0DH (R0DL). A module inside of the bus returns an acknowledge signal A0A in response to R0A. Here, it is assumed that A0A is returned after one clock. Therefore, Req0A changes from Invalid to R0A at time T1. Also, Ack0A changes from Invalid to A0A at time T2. Here, since the issue of R0A is completed once, an acknowledge instruction A0AH is returned to Ack0H. A0AH is converted into the same instruction A0AL of low amplitude by LS_C0. Therefore, Ack0H changes from Invalid to A0AH at time T4, and Ack0L also changes to A0AL with the change.

In parallel with the operation shown in FIG. 8, the same operation is also performed in PE1 in the following manner. In FIG. 9, first, when it is assumed that a read request instruction is issued from CMC_1L to CMD_1H with taking PE1 as a starting point, Req1L changes from Invalid to a read request instruction R1DL at time T0, and it is converted into the same read request instruction R1DH in high level after passing through LS_C1. When CMD_1H receives R1DH, it issues a read request instruction to the bus. Here, when it is assumed that R1DH (R1DL) is a read instruction of 128 bits and a data width of the bus is 128 bits, a read access instruction R1A is issued once to the bus with R1DH (R1DL). A module inside of the bus returns an acknowledge signal A1A in response to R1A. Here, since the same read request is also issued from PE0 to ARBD, it is assumed that the read request signal from PE0 is given a priority to be transmitted and A1A is returned after three clocks of that. Therefore, Req1A changes from Invalid to R1A at time T1. Also, Ack1A changes from Invalid to A1A at time T4. Here, since the issue of R1A is completed once, an acknowledge instruction A1AH is returned to Ack1H. A1AH is converted into the same instruction A1AL of low amplitude by LS_C1. Therefore, Ack1H changes from Invalid to A1AH at time T6, and Ack1L also changes to A1AL with the change of Ack1H.

ARBD which has received read request signals issued from PE0 and PE1 at the same time returns acknowledge signals to PE0 and PE1 based on the priority set as described above. With this, respective read requests are transmitted to DBSC. Here, it is assumed that PE0 is given the priority to be transmitted so that the read request from PE0 and the read request from PE1 are transmitted to DBSC in this order.

Therefore, as shown in FIGS. 8 and 9, when a certain number of times of clock passes after the issues of R0A and R1A from PE0 and PE1 (herein, after 8 clocks), request instructions RA0 and RA1 noticing the result of the read access from the bus are sequentially (herein, twice) issued to ReqA0 and ReqA1, and at the same time, Data0R and Data1R change from Invalid to read results Data0 and Data1, respectively. In response to this, in PE0, CMD_0H issues an acknowledge instruction AA0 to AckA0, and it issues a data acquiring instruction S0A to a data acquiring signal Ct1H0 transmitted to DREG_0H. Thereby, for example, data of 128 bits are acquired once in DREG_0H. On the other hand, in PE1, CMD_1H issues an acknowledge instruction AA1 to AckA1, and it issues a data acquiring instruction S1A to a data acquiring signal Ct1H1 transmitted to DREG_1H. Thereby, for example, data of 128 bits are acquired once DREG_1H.

Since the read request instructions issued from each of CMD_0L and CMD_1L have been completed in the above manner, CMD_0H and CMD_1H issue result notice instructions of the read request RA0H and RA1H toward CMD_0L and CMD_1L as request signals ReqH0 and ReqH1 in response to the same instructions, respectively. At the same time, DREG_0H and DREG_1H output the above-described Data0H and Data1H toward DREG_0L and DREG_1L, respectively. RA0H and RA1H are converted to the same instructions RA0L and RA1L by LS_C0 and LS_C1, respectively, and Data0H and Data1H are converted into Data0L and Data1L of low amplitude by LS_D0 and LS_D1, respectively. When CMD_0L and CMD_1L receive RA0L and RA1L, they return acknowledge instructions AA0L and AA1L in response to the same instructions, respectively, and they issue data acquiring control signals SD0 and SD1 to DREG_0L and DREG_1L as Ct10L and Ct11L, respectively. Thereby, the read Data0 and Data1 are stored in DREG_01 and DREG_1L, respectively.

By realizing the abovementioned operation, in a view from PE0 (CMD_0L) and PE1 (CMD_1L) operating at CLKL, the read request result notices (RA0L, RA1L) are returned after one clock from the issues of the read request instructions (R0DL, R1DL), and further, data requesting the request is stored after another clock.

Figure 10:
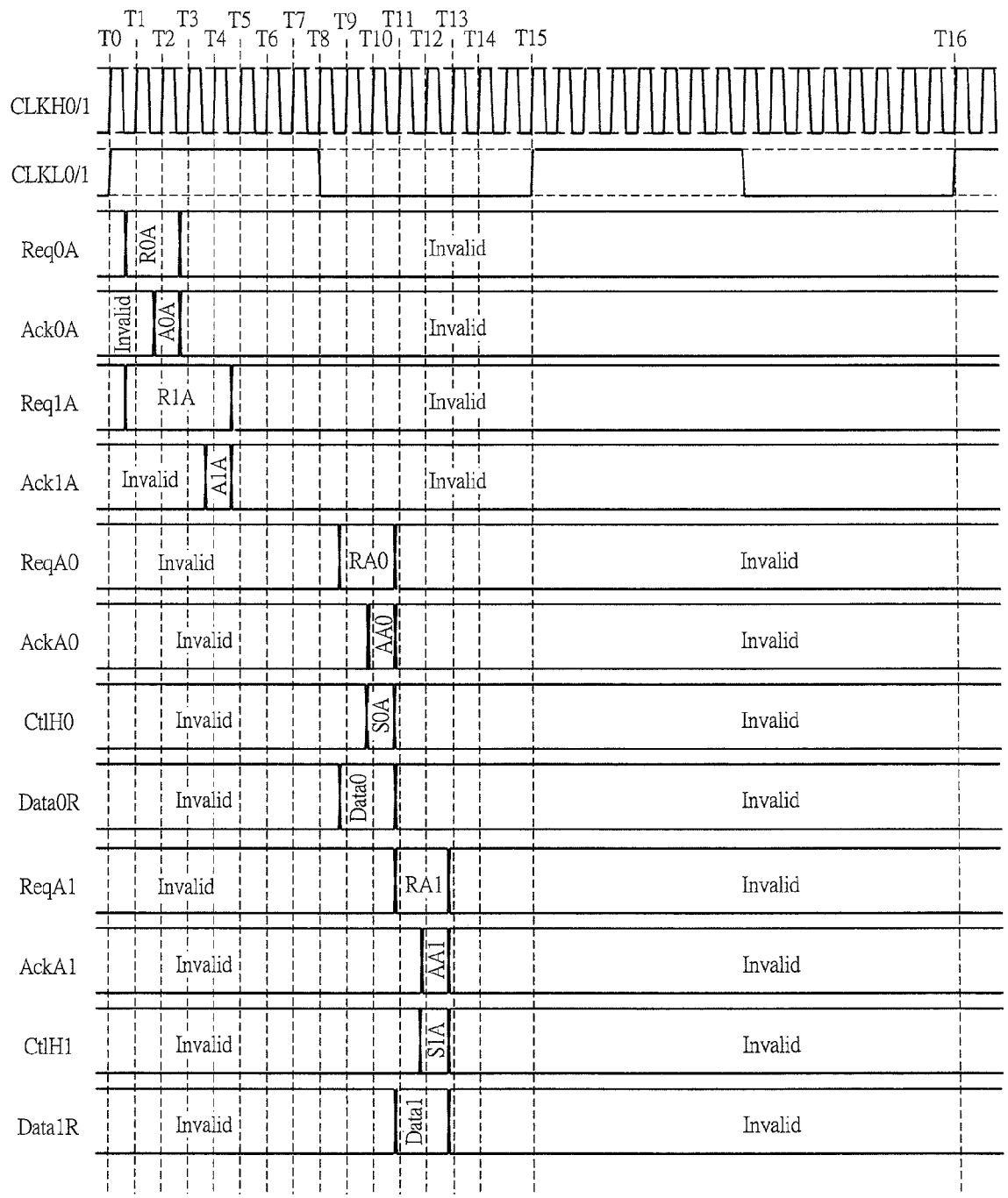
FIG. 10 is a waveform diagram showing an operation example shown in FIG. 7.

FIG. 10 shows an operation waveform obtained by extracting one part of FIGS. 8 and 9 for comparison between FIGS. 8 and 9. As shown in FIG. 10, in the configuration example shown in FIG. 7, when the read request instruction R0DL is issued from PE0 and the read request instruction R1DL is issued from PE1 at time T0, Data0R changes from Invalid to the read result Data0 at time T9 and Data1R changes from Invalid to the read result Data1 at time T11.

In this manner in the configuration example shown in FIG. 7, when read requests are issued from a plurality of processor cores in synchronization with CLKL, read results are data-transmitted in synchronization with CLKH. In the above example, although the read request instructions are issued from PE0 and PE1 at the same time, the instructions to be issued are not limited to the read request. For example, the instructions may be a combination of the read request instruction and the write request instruction, and they may be only the write request instructions. That is, the configuration shown in FIG. 7 is characterized that, when a plurality of data transfer requests (the read request, the write request, or the combination thereof) are required at a time corresponding to the clock CLKL0 (or CLKL1) with low frequency, data transfers corresponding to the respective requests are performed at different timings in synchronization with the clock CLKH0 (or CLKH1) with high frequency. Such an operation is made possible by a configuration in which the clock with low frequency is supplied to the arithmetic section and the clock with high frequency is supplied to the bus. Further, since CMD_0H (CMD_1H) operates at the clock CLKH0 (CLKH1) with high frequency, it is made possible in synchronization with CLKH0 (CLKH1) to receive Ack0A (Ack1A) which is returned when the above-described communication is established. Therefore, it is possible to establish the communication of Data0R or Data0W (Data1R or Data1W) at high speed.

By such a configuration, even if the arithmetic section operates at low voltage and low frequency, data transfer can be performed at high speed based on the high frequency of the bus, so that the arithmetic performance can be improved in a view from the whole SoC.

Also, since the number of pieces of PE which are connected via the bus is about several of pieces in a conventional multi-core, an access latency can be suppressed in some degree by using a bus configuration which can access from each of PE to the memory even if the memory access is caused from the plurality of PE at the same time. However, when the number of pieces of PE reaches several tens of pieces, an area-overhead and the access latency increase in the conventional bus configuration. Accordingly, by operating the bus at higher voltage and higher frequency than those of the arithmetic section as described in this embodiment, the memory access latency in a view from each of PE can be reduced in same degree with the conventional latency without providing a plurality of access paths from each of PE to the memory as shown in the example of FIGS. 7 to 9. Further, by using such a configuration that data transfer to a processor core with a higher priority is performed preferentially as following the priority set in each of processor cores PE0 and PE1, access of low latency is made possible to the data transfer request from the processor core with the higher priority.

The embodiments shown in FIGS. 7 to 10 can be used together with the embodiments shown in FIGS. 5 and 6. That is, it is possible that data is stored by the communication more than once between the bus BS and DREG_H to establish the communication with a bit width between DREG_H and DREG_L, and, when a plurality of data transfer requests (the read request, the write request, or the combination thereof) are required at a time corresponding to the clock CLKL0 (or CLKL1) with low frequency, data transfers corresponding to the respective requests are performed at different timings by adjusting to the clock CLKH0 (or CLKH1) with high frequency. For example, when the frequency of the bus is four times of the frequency of the arithmetic section, a communication which stores two pieces of data in a register can be established to two cores. With this configuration, it is possible to further improve the arithmetic performance.

Here, by considering the embodiments shown in FIGS. 5 to 10 from another view point, the consideration can be also obtained as follows. That is characterized in that the clock with low frequency CLKL is supplied to the arithmetic section in each processor cores, the clock with high frequency CLKH is supplied to the bus, and a data communication is established more than once between the bus and each processor cores in one period of the clock with low frequency CLKL. According to this characteristic, it is also possible to use a communication method in which the bus BS permits to store a plurality of pieces of data between itself and the bus interface BSIF (interface section BIC) and to transmit the data to the arithmetic section in one period of the clock with low frequency as shown in FIGS. 5 and 6, or it is also possible to establish a communication between the plurality of processor cores PE and the bus BS in one period of the clock with low frequency as shown in FIGS. 7 to 10. Thereby, it is possible to improve the arithmetic performance in the view from the whole SoC.

Further, by considering the embodiments shown in FIGS. 5 to 10 from another view point, the consideration can be also obtained as follows. That is characterized in that the clock with low frequency CLKL is supplied to the arithmetic section in each processor cores, the clock with high frequency CLKH is supplied to the bus, and the interface section BIC issues a data transfer request to the bus BS and receives an acknowledge signal corresponding to the data transfer request from the bus BS, and then, performs the data transfer corresponding to the data transfer request in one period of the clock with low frequency CLKL. Also according to this characteristic, it is also possible to use a communication method in which the bus BS permits to store a plurality of pieces of data between itself and the interface section BIC and to transmit the data to the arithmetic section in one period of the clock with low frequency as shown in FIGS. 5 and 6, or it is also possible to establish the communication between the plurality of processor cores PE and the bus BS in one period of the clock with low frequency as shown in FIGS. 7 to 10. Thereby, it is possible to improve the arithmetic performance in the view from the whole SoC.

Figure 11:
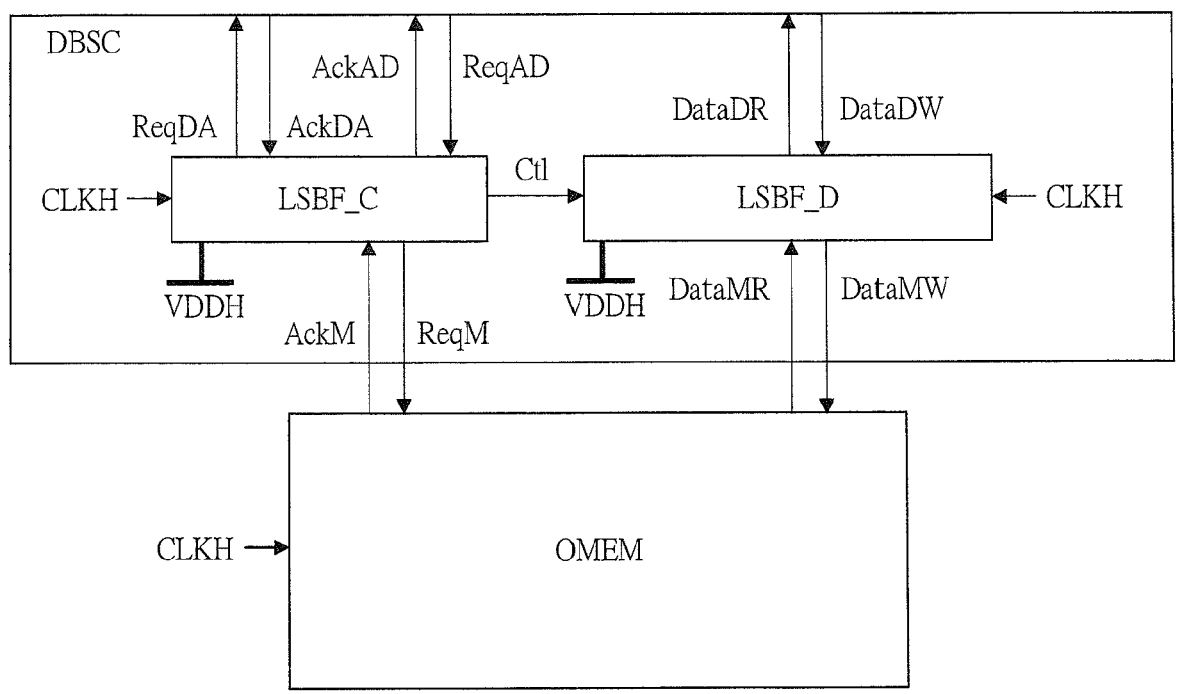
FIG. 11 is a block diagram showing a configuration example of a memory controller of the information processing device shown in FIG. 1 or FIG. 2.

FIG. 11 shows a configuration example of the memory controller DBSC shown in FIG. 1 or FIG. 2. Here, although DBSC will be described as an example, even if the on-chip-memory ON_MEM instead of DBSC is used, it can be considered that the same operation is performed by regarding an external memory OMEM as the on-chip-memory. Also, in modules configuring DBSC, general modules such as an address generator and a buffer are not shown for simplification, and only modules provided in the present embodiment are shown. DBSC shown in FIG. 11 includes a block with combining level shifter and buffer for command LSBF_C and a block with combining level shifter and buffer for data LSBF_D as modules. A level shift performed by LSBF_C and LSBF_D is not a level shift between VDDH and VDDL but a level shift between VDDH and the operation voltage of OMEM. However, when OMEM operates at VDDH, it is unnecessary to perform the level shift, and only control of data flow as described below is performed.

The high voltage VDDH is supplied to both of LSBF_C and LSBF_D to operate in synchronization with the clock with high amplitude and high frequency CLKH. LSBF_C and the bus are connected therebetween by a request signal (including an address signal) ReqDA from LSBF_C to the bus, an acknowledge signal AckDA corresponding to ReqDA, a request signal (including an address signal) ReqAD from the bus to LSBF_C, and an acknowledge signal AckAD corresponding to ReqAD. LSBF_C and OMEM are connected therebetween by a request signal (including an address signal) ReqM from LSBF_C to OMEM and an acknowledge signal AckM corresponding to ReqM. LSBF_D and the bus are connected therebetween by data input/output signals DataDR and DataDW. LSBF_D and OMEM are connected therebetween by data input/output signals DataMR and DataMW. Note that, although each of these signal lines is represented by one signal line for descriptive purpose, the signal lines may be zero, or one or more line.

Figure 12:
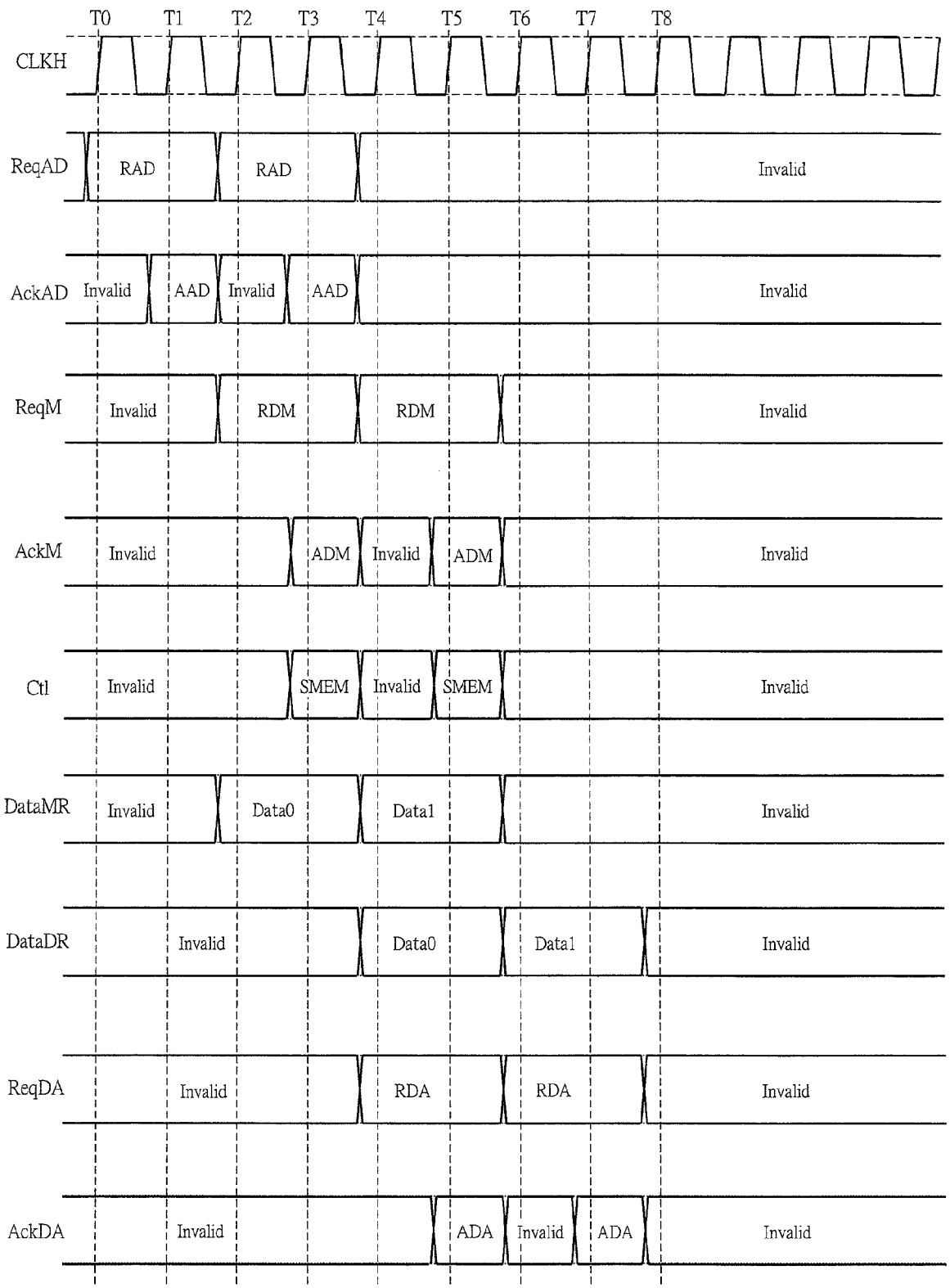
FIG. 12 is a waveform showing an operation example shown in FIG. 11.

FIG. 12 shows an operation waveform when a read request is issued from the bus to OMEM twice as an operation example shown in FIG. 11. First, when it is assumed that a read request instruction RAD is issued from the bus to DBSC, ReqAD changes from Invalid to the read request instruction RAD at time T0, and ReqAD also changes to a second RAD at time T2. When LSBF_C receives RAD, it issues an acknowledge instruction AAD to the bus and issues a read request instruction RDM to OMEM. OMEM outputs a requested data Data0 in response to the RDM, and at the same time, returns an acknowledge signal ADM. Here, it is assumed that ADM is returned after one clock from the reception of RDM.

Therefore, AckAD changes from Invalid to AAD at time T1, ReqM changes from Invalid to RDM and DataMR changes from Invalid to Data0 at time T2, and AckM changes from Invalid to ADM at time T3. LSBF_C issues ADM to OMEM, and at the same time, issues a data storage instruction SMEM to LSBF_D. LSBF_D receives the data storage instruction SMEM to store Data0 which is the value of DataMR in its own local buffer. LSBF_C issues a result notice instruction of the read request RDA to the bus after DataMR is stored in the local buffer of LSBF_D. In this example, since there is no request from another module, an acknowledge instruction ADA corresponding to the same instruction is issued from the bus to LSBF_C after one clock.

Figure 13:
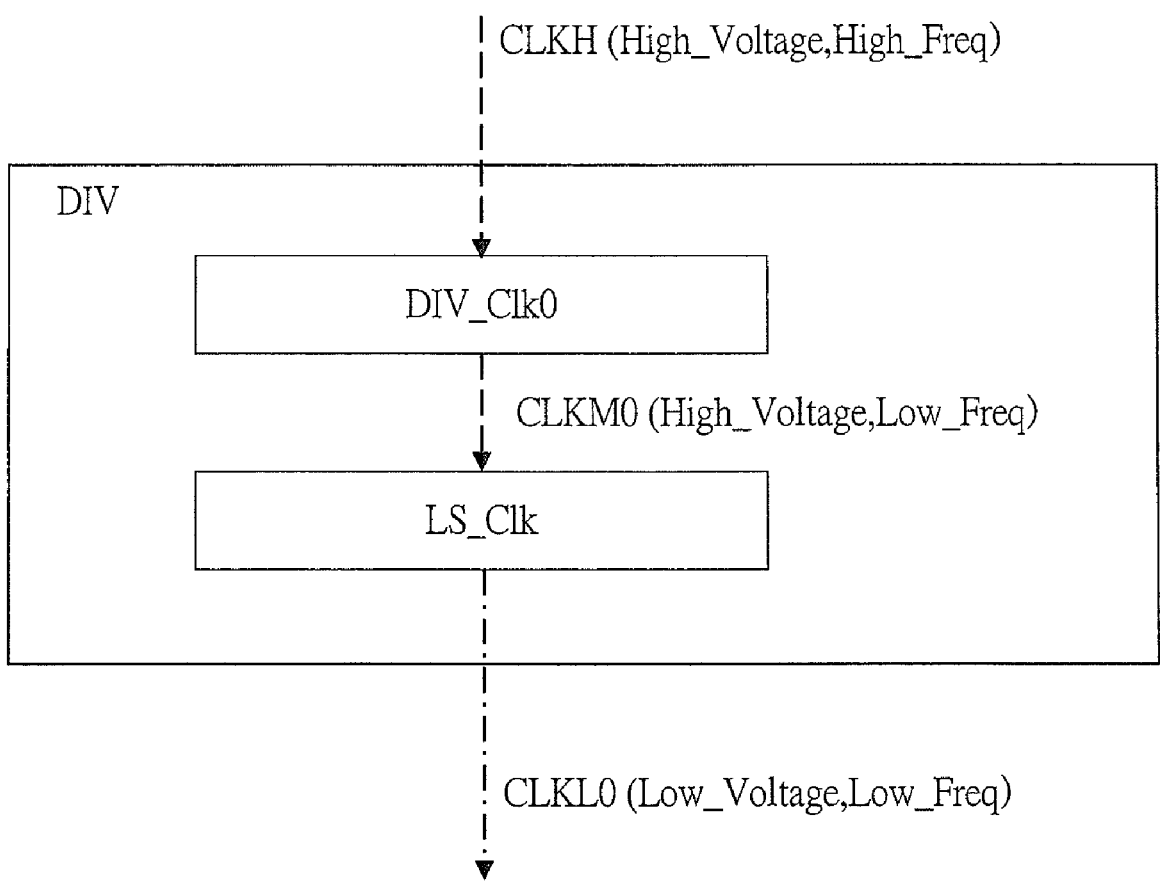
FIG. 13 is a block diagram showing a configuration example of a frequency divider of the information processing device shown in FIGS. 1, 2, and 5.
Figure 14:
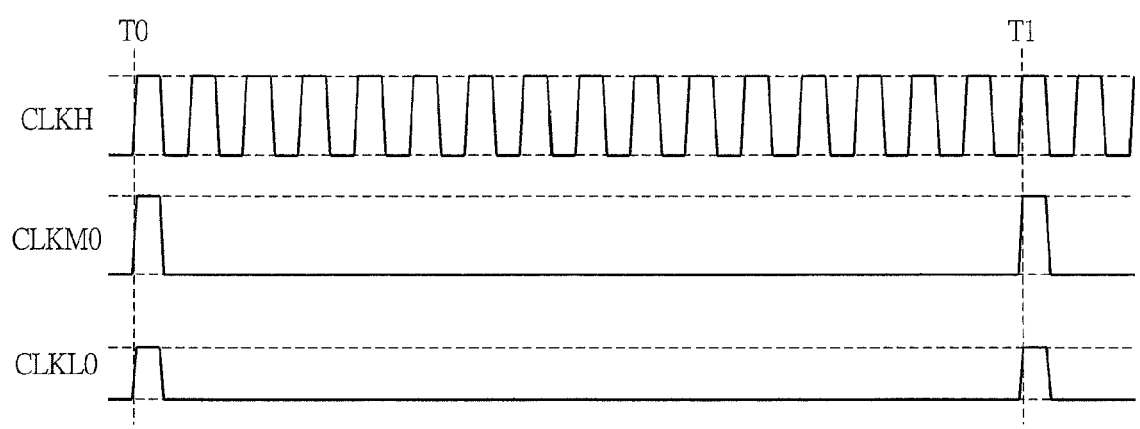
FIG. 14 is a waveform diagram showing an operation example shown in FIG. 13.

FIG. 13 shows a first configuration example of the frequency divider DIV shown in FIGS. 1, 2, and 5. DIV shown in FIG. 13 is configured with a teeth-missing-type clock frequency divider DIV_Clk0 and a lever shifter LS_Clk. The clock with high amplitude and high frequency CLKH is inputted to DIV_Clk0, and it is converted into teeth-missing clock with high amplitude CLKM0 obtained by removing clocks for a designated cycle. The cycle is, for example, 4, 8, 16, or the like. CLKM0 further passes through LS_Clk to be converted into a teeth-missing clock with low amplitude CLKL0. This aspect is shown in FIG. 14. Since a packaging is easy for the frequency conversion by such a teeth-missing, there is a merit to realize with a small area unless there is especially a problem in a timing design of a block operating at low amplitude and low frequency in the teeth-missing clock. Further, if there is a sufficient margin for the timing design of the block operating at low amplitude and low frequency and CLKL0 does not disappear during propagation thereof because of few timing shift of a clock signal line, it is possible to further save the power by properly changing power supply voltage and frequency of the block operating at low amplitude and low frequency.

Figure 15:
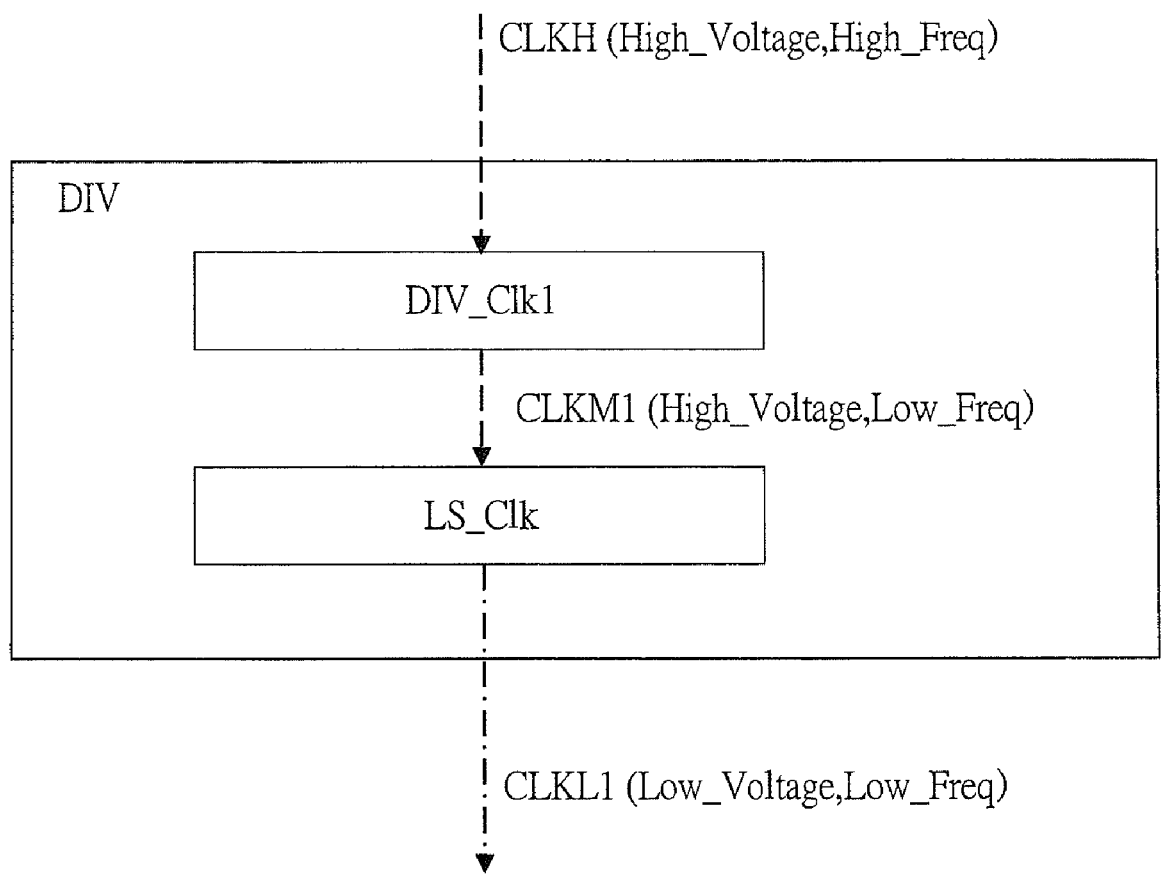
FIG. 15 is a block diagram showing another configuration example of the frequency divider of the information processing device shown in FIGS. 1, 2, and 5.
Figure 16:
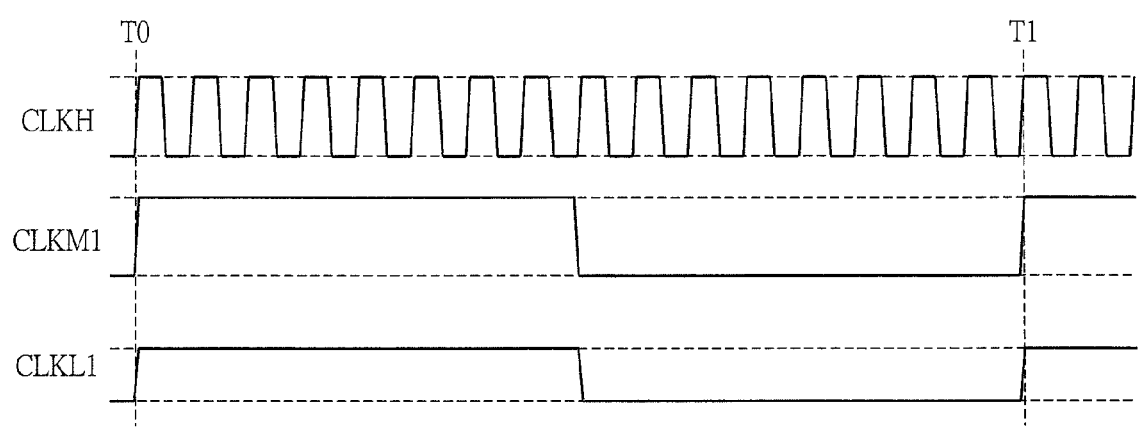
FIG. 16 is a waveform diagram showing an operation example shown in FIG. 15.

FIG. 15 shows a second configuration example of the frequency divider DIV shown in FIGS. 1, 2, and 5. DIV shown in FIG. 15 is configured with a clock frequency divider holding duty cycle of 50% DIV_Clk1 and a lever shifter LS_Clk. The clock with high amplitude and high frequency CLKH is inputted to DIV_Clk1, and it is converted into a clock with high amplitude and low frequency CLKM1 obtained by dividing clocks with a designated cycle. The cycle is, for example, 4, 8, 16, or the like. CLKM10 further passes through LS_Clk to be converted into a clock with low amplitude and low frequency CLKL1. This aspect is shown in FIG. 16. Although the packaging or the timing design are not easier than the case of FIG. 13 in such a frequency conversion holding the duty ratio of 50%, it is possible to save the power by properly changing power supply voltage and frequency of the block operating at low amplitude and low frequency.

Second Embodiment

Figure 17:
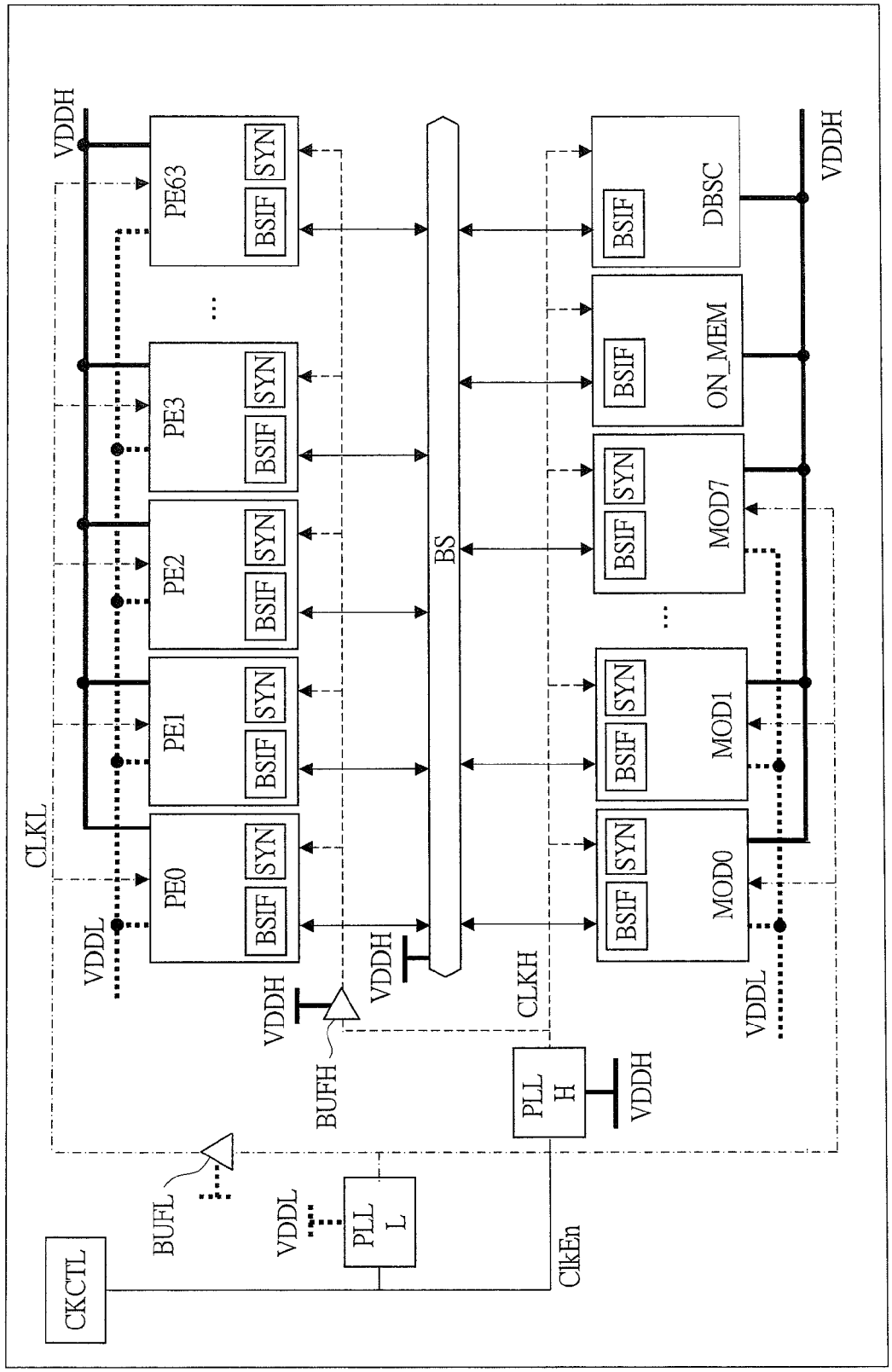
FIG. 17 is a block diagram showing one example of a configuration of an information processing device according to a second embodiment of the present invention.

FIG. 17 is a block diagram showing one example of a configuration in an information processing device according to a second embodiment of the present invention. In the configuration example shown in FIG. 17, an oscillator PLLH of the clock with high amplitude and high frequency CLKH and an oscillator PLLL of the clock with low amplitude and low frequency CLKL are individually mounted instead of the oscillator PLL shown in FIG. 1 compared with the configuration example in FIG. 1. The high voltage VDDH is supplied to PLLH, and the low voltage VDDL is supplied to PLLL. PLLH and PLLL are controlled by a clock control signal ClkEn transmitted from a clock controller CKCTL. CLKH is propagated by a buffer circuit BUFH for a clock with high amplitude and high frequency, and CLKL is propagated by a buffer circuit BUFL for a clock with low amplitude and low frequency. Note that, although each of BUFH and BUFL are shown to be represented by only one piece, any number of pieces of BUFH may be arranged on the propagation path of CLKH and any number of pieces of BUFL may be arranged on the propagation path of CLKL.

More particularly, the configuration example shown in FIG. 17 has an effect that it is possible to eliminate a system for generating the clock with low amplitude and low frequency for individual processor cores PE by providing the oscillator PLLL. The effect is particularly effective when many processor cores are mounted. This is why, since the system is unnecessary in the respective processor cores, it is possible to largely reduce a circuit area.

Figure 18:
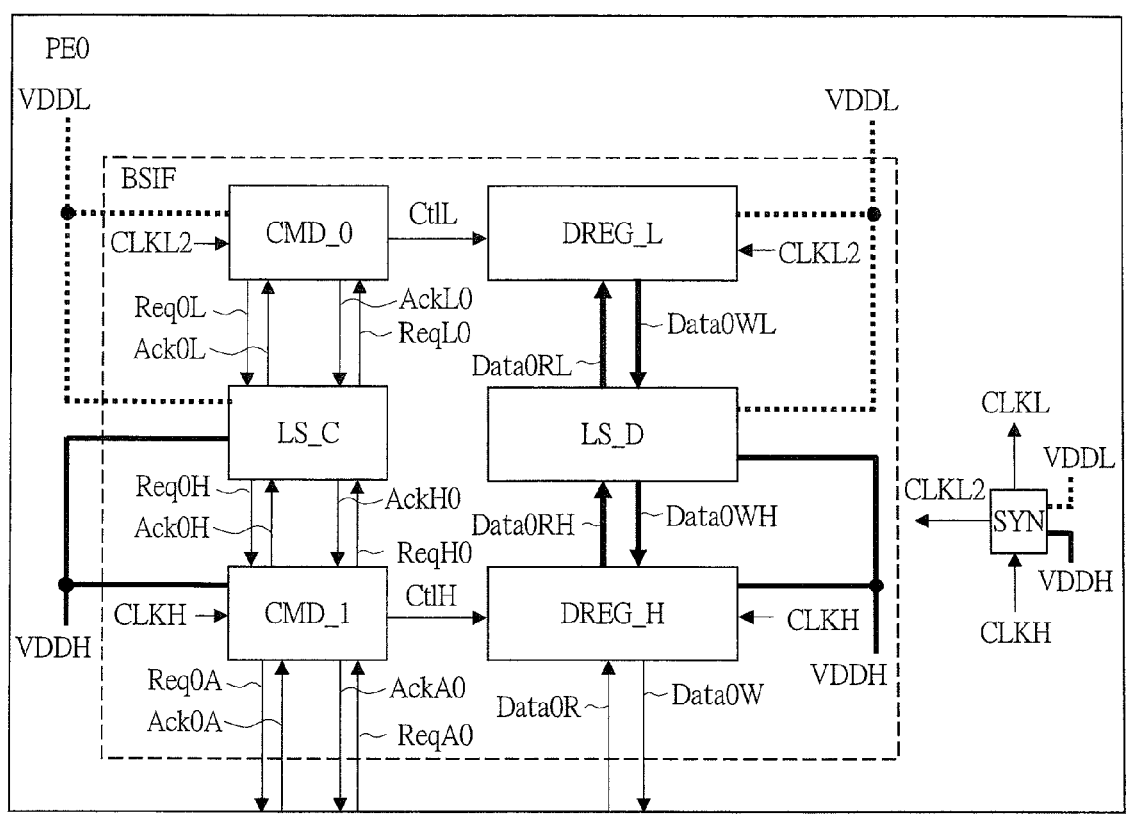
FIG. 18 is a block diagram showing a specific configuration example of a processor core of the information processing device shown in FIG. 17.

FIG. 18 shows a configuration example of the processor core PE shown in FIG. 17. Here, although PE0 will be described as an example, another PE except for PE0 or MOD has also the same configuration. PE0 shown in FIG. 18 is similar to PE0 shown in FIG. 5 except for replacing DIV to a clock synchronizer block SYN compared with PE0 shown in FIG. 5. The high voltage VDDH and the low voltage VDD are supplied to SYN. And, two of the clock with high amplitude and high frequency CLKH and the clock with low amplitude and low frequency CLKL are inputted to SYN to output a clock with low amplitude and low frequency CLKL2 whose phase is adjusted so as to synchronize with CLKH. Note that the CLKL2 is supplied to CMD_0 and DREG_L instead of CLKL in FIG. 5.

Figure 19:
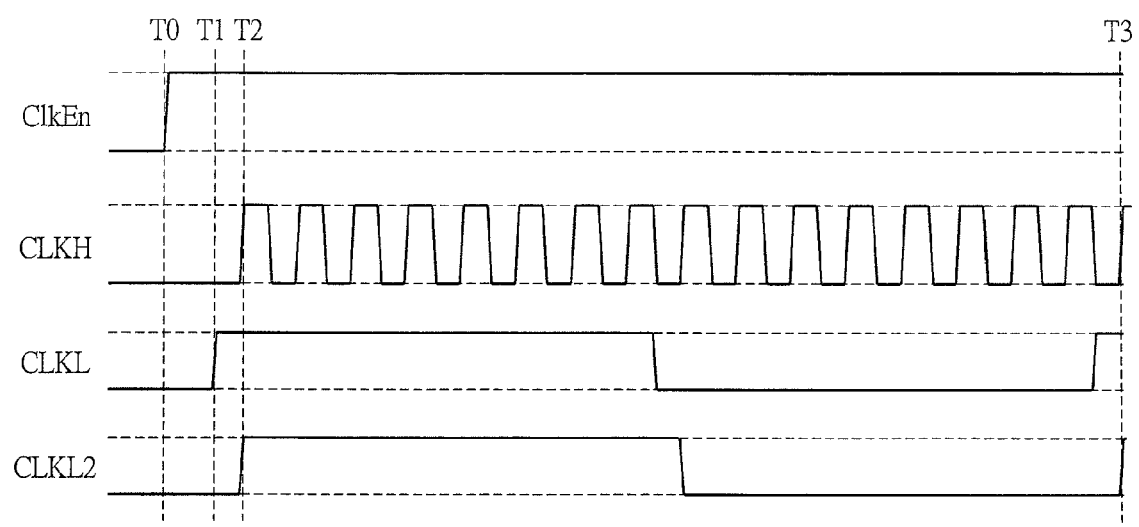
FIG. 19 is a waveform diagram showing an operation example of a clock synchronizer block in FIGS. 17 and 18.

FIG. 19 shows operation examples of CLKH, CLKL, and CLKL2 in a case of receiving a notice of a clock control signal ClkEn as operation examples of FIGS. 17 and 18. ClkEn is turned on at time T1 so that clocks CLKH and CLKL are outputted from PLLH and PLLL. Ideally, it is desirable that there is no phase difference between CLKH and CLKL which reach PE0. However, it is assumed that the phase difference of T2−T1 actually occurs. In such a case, SYN adjusts the delay by a buffer or the like and it outputs CLKL2 with a small phase difference in a view from CLKH whose phase is delayed in this example.

As described above, since frequency division in an inside of PE and MOD is unnecessary if the information processing device according to the second embodiment has a margin in a wiring area of an SoC and it is possible to individually package a clock with high amplitude and high frequency and a clock with low amplitude and low frequency, scaling down of the area size and saving of the power can be realized.

Third Embodiment

Figure 20:
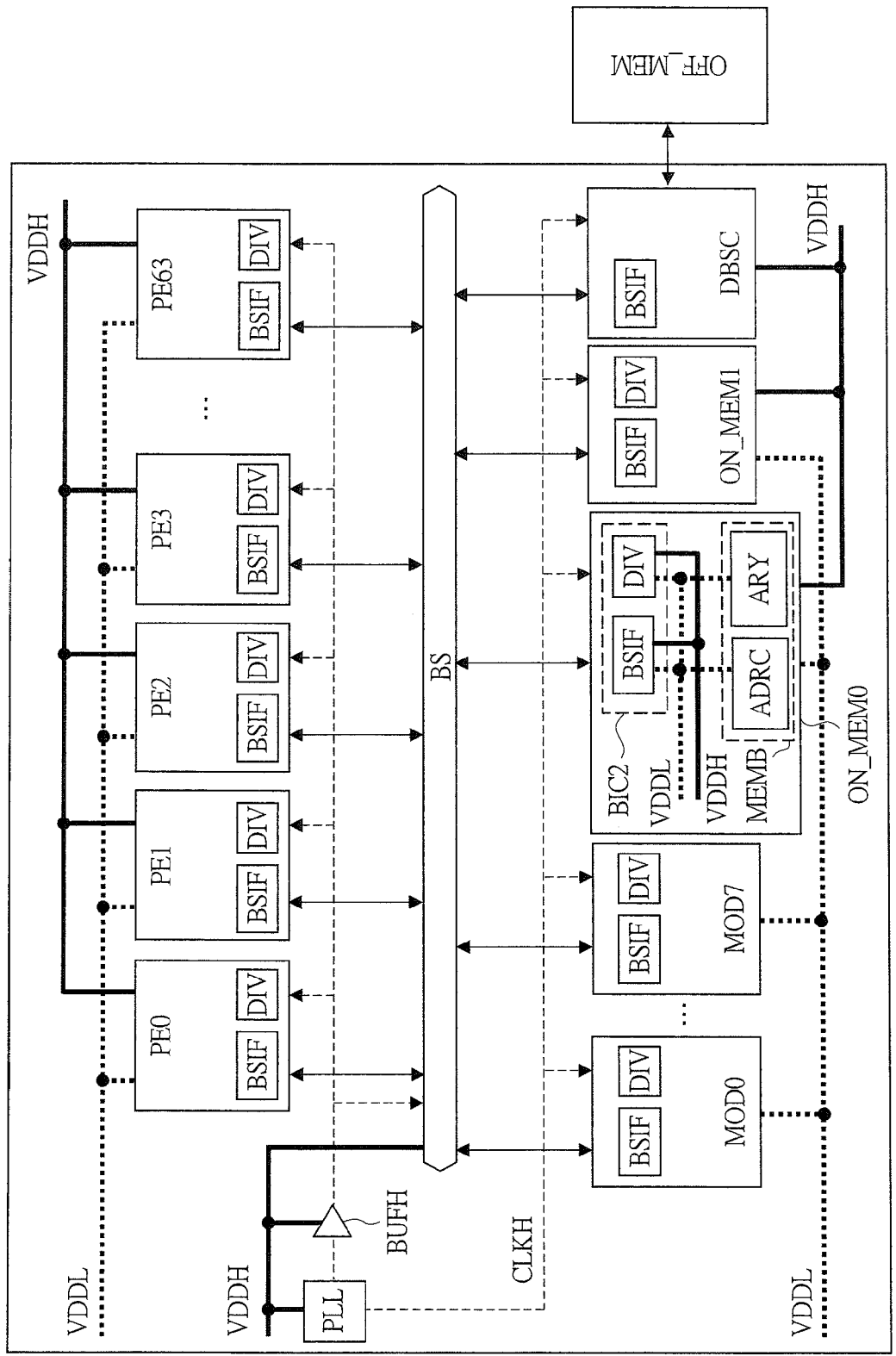
FIG. 20 is a block diagram showing one example of a configuration of an information processing device according to a third embodiment of the present invention.

FIG. 20 is a block diagram showing one example of a configuration of an information processing device according to a third embodiment of the present invention. If there is a margin in the area of the SoC, it is possible to mount two on-chip-memory modules (ON_MEM0 and ON_MEM1) on the SoC. For description of a power supply wire connection inside of ON_MEM, an inside of only ON_MEM0 is described as a representative. As main constituent elements of ON_MEM0, although there are an interface section BIC2 including a bus interface BSIF and a frequency divider DIV, a memory section MEMB including an address controller ADRC and a memory cell array ARY, and the like, it may be configured with other elements except for these elements. Although there are two types of VDDH and VDDL as the power supply which is supplied to ON_MEM0, two types of VDDH and VDDL are supplied to the interface section BIC2 including BSIF and DIV which performs the frequency conversion and the level conversion, and only VDDL is supplied to the memory section MEMB including ADRC and ARY. In ESIF and DIV, the same configuration with that of FIG. 5 can be used.

It is rare that many processor cores configure one cluster as a whole thereof, and they are generally divided into a plurality of clusters to perform a different process in each of clusters. These groups are properly sorted to ON_MEM0 and ON_MEM1 according to an access frequency of these groups to the on-chip-memory, so that the access frequency in a view from one on-chip-memory can be reduced. For example, by dividing sixty four pieces of PE and 7 pieces of MOD into two groups so as not to bias the access frequency to the on-chip-memory, it is possible to maintain a throughput similar to the conventional art even if the frequency of the on-chip-memory is made be half. At this time, for example, in ON_MEM0, while BSIF is connected to the bus BS operating at high frequency to operate at high frequency for managing queue of an instruction and data, constituent elements except for BSIF (for example, the memory section MEMB including ADRC, ARY, and the like) can operate at low frequency.

With the manner described above, since the on-chip-memory (memory section MEMB) can operate at low amplitude and low frequency in addition to PE and MOD, it is possible to further save the power. Although the number of pieces of on-chip-memory module to be mounted is set to two in the third embodiment, the number may be more than that, or it may be one if the access load to the memory is small. Note that, the third embodiment can be used in combination with the second embodiment, of course.

Fourth Embodiment

Figure 21:
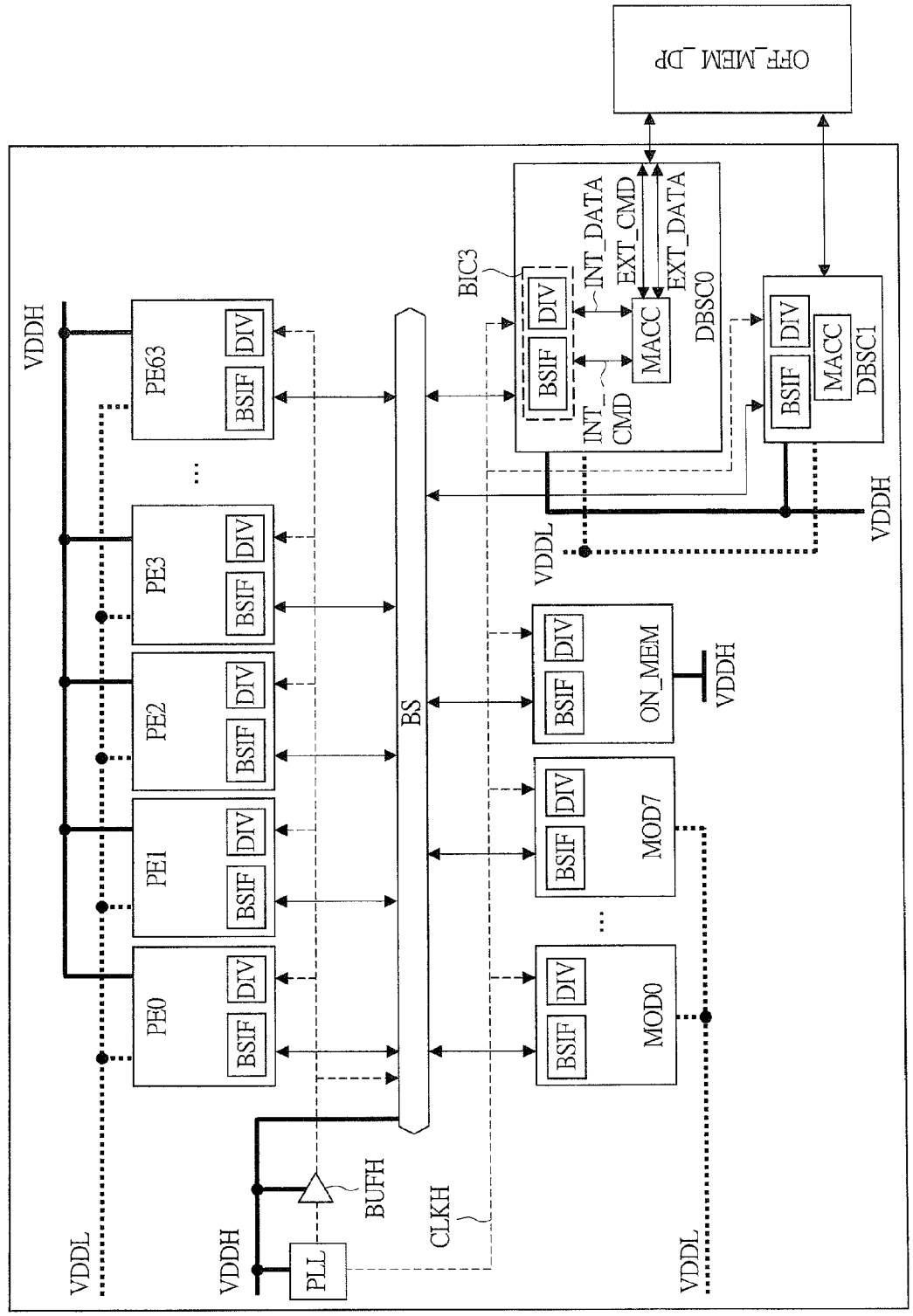
FIG. 21 is a block diagram showing one example of a configuration of an information processing device according to a fourth embodiment of the present invention.

FIG. 21 is a block diagram showing one example of a configuration of an information processing device according to a fourth embodiment of the present invention. If there is a margin in an area of a SoC, it is possible to mount two memory controllers (DBSC0 and DBSC1) on the SoC. DBSC0 and DBSC1 are each provided with, for example: an interface section BIC3 including the bus interface BSIF and the frequency divider DIV similar to those shown in FIG. 5; and a memory access controller MACC performing transmission and reception of an internal command signal INT_CMD and an internal data signal INT_DATA whose voltages and register widths are converted at BSIF to/from an external memory OFF_MEM_DP as an external command signal EXT_CMD and an external data signal EXT_DATA. At this time, MACC may take a structure such as a buffer or FIFO for absorbing various latencies such as access/response to the external memory OFF_MEM_DP. In this manner, since a memory controller (memory access controller MACC) can operate at low amplitude and low frequency in addition to PE and MOD, it is possible to further save the power.

Although the off-chip-memory OFF_MEM_DP is made to be a dual port to be connected to DBSC0 and DBSC1 in the fourth embodiment, two off-chip-memories may be mounted to be connected to DBSC0 and DBSC1, respectively. Further, although the number of pieces of memory controller to be mounted is set to two in the fourth embodiment, it may be more than that, or it may be one. Still Further, a connection form between the memory controller and the off-chip-memory may be configured by properly combining a single port, a dual port, a triple port, and the like. Note that, the fourth embodiment can be used in combination with the second embodiment and/or the third embodiment, of course.

Fifth Embodiment

Figure 22:
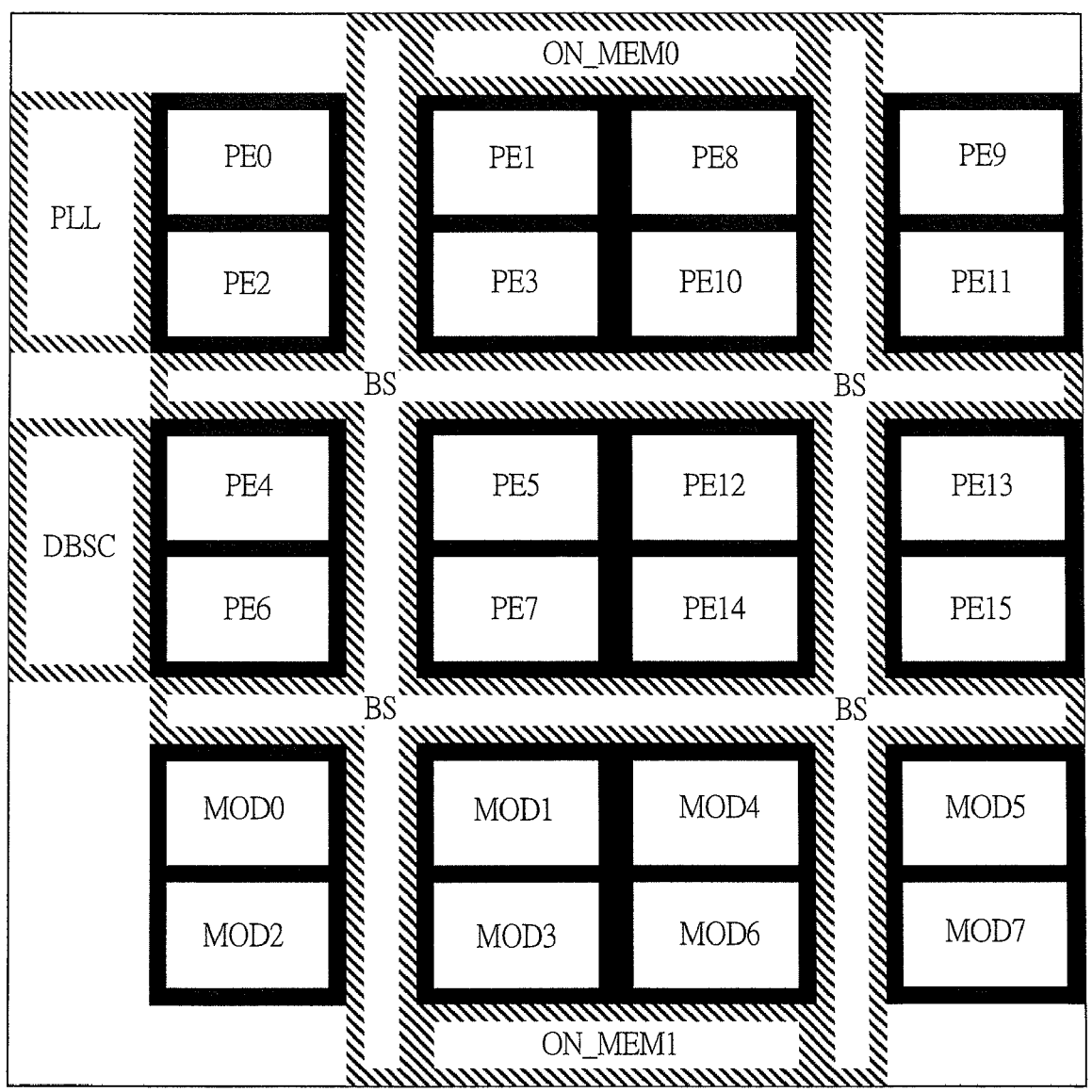
FIG. 22 is a schematic diagram showing one example of a chip layout of an information processing device according to a fifth embodiment of the present invention.
Figure 23:
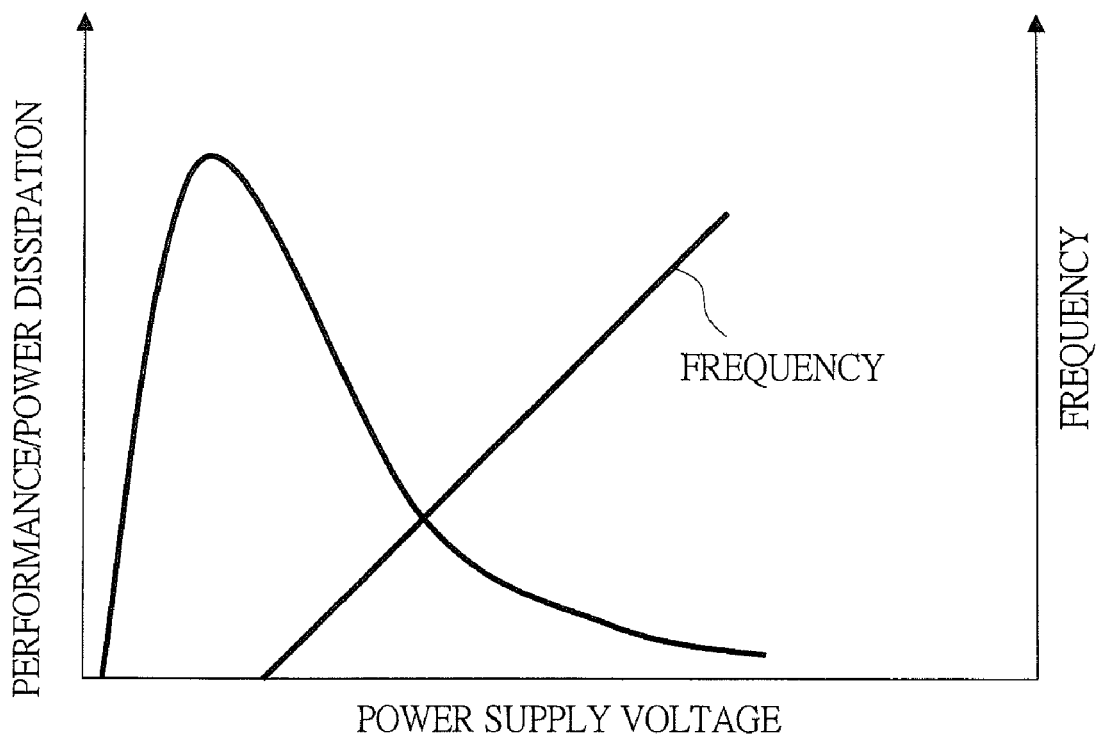
FIG. 23 is an explanatory diagram showing a relation among a power supply voltage, a frequency, and a ratio of performance per power dissipation in LSI.

FIG. 22 is a schematic diagram showing one example of a chip layout of an information processing device according to a fifth embodiment of the present invention. In FIG. 22, a thick solid line shows those of voltage source main line with low voltage arranged in a module interface, and a shaded line shows those of voltage source main line with high voltage arranged in a module interface. These voltage source main lines are characterized in that, the voltage source main line with low voltage is arranged along a periphery of a processor core in each processor cores, and the voltage source main line with high voltage is arranged along a bus which is arranged so as to surround the processor core.

According to this characteristic, it is possible to efficiently perform a layout when two types of power supply are arranged, so that the manner becomes advantageous in points of easiness of the layout or circuit scale. More particularly, since the voltage source main line with low voltage is supplied to individual processors, they are required to be stable. Therefore, by individually supplying the power supply with low voltage by using the layout of the present embodiment, it is possible to perform more stably operating in each of processor cores by the power supply with low voltage VDDL.

As described above, by using each embodiments of the present invention, typically, an effect can be obtained such that saving power can be achieved as assuring absolute performance by operating many processor cores with a high ratio of performance per power dissipation in parallel.

In the foregoing, the invention made by the inventors of the present invention has been concretely described based on the embodiments. However, it is needless to say that the present invention is not limited to the foregoing embodiments and various modifications and alterations can be made within the scope of the present invention.

The information processing device according to this embodiment is a technique effectively applied to an information processing device in which many processors are mounted on one semiconductor chip in particular, but it is not limited to this, and it is widely applicable to various multiprocessor systems in general.

What is claimed is:

1. An information processing device comprising:
    a first processor core;
    a second processor core; and
    a bus connected to both the first processor core and the second processor core, wherein
        the first processor core includes a first arithmetic section for performing arithmetic operation,
        the second processor core includes a second arithmetic section for performing arithmetic operation,
        a power supply with a higher voltage than a power supply with the highest voltage that is supplied to the first arithmetic section is supplied to the bus, and a power supply with a higher voltage than a power supply with the highest voltage that is supplied to the second arithmetic section is supplied to the same,
        a clock with a higher frequency than a clock with the highest frequency that is supplied to the first arithmetic section is supplied to the bus, and a clock with a higher frequency than a clock with the highest frequency that is supplied to the second arithmetic section is supplied to the same,
        the first processor core further includes a first interface section for performing input and output of data between the bus and the first arithmetic section,
        the second processor core further includes a second interface section for performing input and output of data between the bus and the second arithmetic section,
        a first power supply and a first clock are supplied to the first arithmetic section,
        a second power supply and a second clock are supplied to the second arithmetic section,
        a third power supply with a higher voltage than those of the first power supply and the second power supply is supplied to the bus, and a third clock with a higher frequency than those of the first clock and the second clock is supplied to the same,
        the first power supply and the third power supply are supplied to the first interface section, and the first clock and the third clock are supplied to the same, and
        the second power supply and the third power supply are supplied to the second interface section, and the second clock and the third clock are supplied to the same.

2. The information processing device according to claim 1, wherein
    the first processor core transmits a first data transfer request signal for requesting a first data transfer between the bus and the first processor core to the bus at a first time,
    the second processor core transmits a second data transfer request signal for requesting a second data transfer between the bus and the second processor core to the bus at the first time,
    the bus performs the first data transfer at a second time,
    the bus performs the second data transfer at a third time different from the second time,
    the first time, the second time, and the third time are within a range of one period of the first clock, and
    the first time, the second time, and the third time are within a range of one period of the second clock.

3. The information processing device according to claim 1, wherein
    the first interface section further includes a first command generating block for transmitting a first data transfer request signal to the bus and receiving an acknowledge signal corresponding to the first data transfer request signal from the bus,
    the second interface section further includes a second command generating block for transmitting a second data transfer request signal to the bus and receiving an acknowledge signal corresponding to the second data transfer request signal from the bus, and
    the third clock is supplied to the first command generating block and the second command generating block.

4. The information processing device according to claim 1, wherein
    the first interface section further includes a first bus interface provided with: a first register to which the first power supply and the first clock are supplied; and a second register to which the third power supply and the third clock are supplied,
    the second register is connected to the bus with an n-bit width ("n" is a natural number) and is connected to the first register with a m-bit width ("m" is a natural number larger than "n"), and
    the second register stores a plurality of pieces of data received from the bus and transmits the data to the first register.

5. The information processing device according to claim 1, further comprising:
    a first oscillating circuit for supplying the first clock to the first arithmetic section and supplying the second clock to the second arithmetic section; and
    a second oscillating circuit for supplying the third clock to the bus, the first interface section, and the second interface section.

6. The information processing device according to claim 5, wherein
   the first processor core further includes a first clock synchronizer block for matching phases between the first clock and the third clock, and
   the second processor core further includes a second clock synchronizer block for matching phases between the second clock and the third clock.

7. The information processing device according to claim 1, further comprising:
   a first oscillating circuit for supplying the third clock to the bus, the first interface section, and the second interface section, wherein
      the first interface section includes a first frequency divider for converting the third clock into the first clock to supply the same to the first arithmetic section, and
      the second interface section includes a second frequency divider for converting the third clock into the second clock to supply the same to the second arithmetic section.

8. The information processing device according to claim 1, further comprising:
   an on-chip-memory which is provided with: a third interface section for performing input and output of data between the bus and the on-chip-memory; and
   a memory section for storing the data, wherein
      the first power supply and the first clock are supplied to the memory section, and
      the third power supply and the third clock are supplied to the third interface section.

9. The information processing device according to claim 1, further comprising:
   a memory controller which is provided with: a fourth interface section for performing input and output of data between the bus and the memory controller; and a communication section for establishing a communication with an external memory of the information processing device, wherein
      the first power supply and the first clock are supplied to the communication section, and
      the third power supply and the third clock are supplied to the fourth interface section.

10. The information processing device according to claim 1, further comprising first, second, and third voltage source lines, wherein
   the first processor core and the second processor core are arranged so as to face the bus,
   the first voltage source line is arranged along the first processor core to supply the first power supply to the first processor core,
   the second voltage source line is arranged along the second processor core to supply the second power supply to the second processor core, and
   the third voltage source line is arranged along the bus to supply the third power supply to the bus.

11. An information processing device comprising:
   a first processor core;
   a second processor core; and
   a bus connected to both the first processor core and the second processor core, wherein
      the first processor core includes a first arithmetic section for performing arithmetic operation,
      the second processor core includes a second arithmetic section for performing arithmetic operation,
      a first clock is supplied to the first arithmetic section,
      a second clock is supplied to the second arithmetic section,
      a third clock higher in frequency than the first clock and the second clock is supplied to the bus,
      an input and output of data are performed more than once between the bus and the first processor core in one period of the first clock,
      the input and output of data are performed more than once between the bus and the second processor core in one period of the second clock,
      the first processor core further includes a first interface section for performing input and output of data between the bus and the first arithmetic section,
      the second processor core further includes a second interface section for performing input and output of data between the bus and the second arithmetic section,
      a first power supply is supplied to the first arithmetic section,
      a second power supply is supplied to the second arithmetic section,
      a third power supply with a higher voltage than those of the first power supply and the second power supply is supplied to the bus,
      the first power supply and the third power supply are supplied to the first interface section, and the first clock and the third clock are supplied to the same, and
      the second power supply and the third power supply are supplied to the second interface section, and the second clock and the third clock are supplied to the same.

12. An information processing device comprising:
   a first processor core;
   a second processor core; and
   a bus connected to both the first processor core and the second processor core, wherein
      the first processor core includes a first arithmetic section for performing arithmetic operation,
      the second processor core includes a second arithmetic section for performing arithmetic operation,
      a first clock is supplied to the first arithmetic section,
      a second clock is supplied to the second arithmetic section,
      a third clock higher in frequency than the first clock and the second clock is supplied to the bus,
      an input and output of data are performed more than once between the bus and the first processor core in one period of the first clock,
      the input and output of data are performed more than once between the bus and the second processor core in one period of the second clock,
      the first processor core transmits, to the bus at a first time, a first data transfer request signal for requesting a first data transfer between the bus and the first processor core,
      the second processor core transmits, to the bus at the first time, a second data transfer request signal for requesting a second data transfer between the bus and the second processor core,
      the bus performs the first data transfer at a second time,
      the bus performs the second data transfer at a third time different from the second time,
      the first time, the second time, and the third time are within a range of one period of the first clock, and
      the first time, the second time, and the third time are within a range of one period of the second clock.

13. The information processing device according to claim 12, wherein the first processor core further includes a first interface section for performing input and output of data between the bus and the first arithmetic section, the second processor core further includes a second interface section for performing input and output of data between the bus and the second arithmetic section, the first interface section stores a plurality of pieces of data received from the bus to transmit the data to the first arithmetic section, and the second interface section stores a plurality of pieces of data received from the bus to transmit the data to the second arithmetic section.

14. An information processing device comprising:

a first processor core;

a second processor core; and a bus connected to both the first processor core and the second processor core, wherein the first processor core includes: a first arithmetic section for performing arithmetic operation; and a first interface section for performing input and output of data between the bus and the first arithmetic section, the second processor core includes: a second arithmetic section for performing arithmetic operation; and a second interface section for performing input and output of data between the bus and the second arithmetic section, a first clock is supplied to the first arithmetic section, a second clock is supplied to the second arithmetic section, a third clock higher in frequency than the first clock and the second clock is supplied to the bus, the first interface section transmits a first data transfer request to the bus, receives a first acknowledge signal corresponding to the first data transfer request from the bus, and then performs a first data transfer corresponding to the first data transfer request, the second interface section transmits a second data transfer request to the bus, receives a second acknowledge signal corresponding to the second data transfer request from the bus, and then performs a second data transfer corresponding to the second data transfer request, the transmission of the first data transfer request, the reception of the first acknowledge signal, and the first data transfer are performed in one period of the first clock, the transmission of the second data transfer request, the reception of the second acknowledge signal, and the second data transfer are performed in one period of the second clock, a first power supply is supplied to the first arithmetic section, a second power supply is supplied to the second arithmetic section, a third power supply with a higher voltage than those of the first power supply and the second power supply is supplied to the bus, the first power supply and the third power supply are supplied to the first interface section, and the first clock and the third clock are supplied to the same, and the second power supply and the third power supply are supplied to the second interface section, and the second clock and the third clock are supplied to the same.

15. An information processing device comprising:

a first processor core;

a second processor core; and a bus connected to both the first processor core and the second processor core, wherein the first processor core includes: a first arithmetic section for performing arithmetic operation; and a first interface section for performing input and output of data between the bus and the first arithmetic section, the second processor core includes: a second arithmetic section for performing arithmetic operation; and a second interface section for performing input and output of data between the bus and the second arithmetic section, a first clock is supplied to the first arithmetic section, a second clock is supplied to the second arithmetic section, a third clock higher in frequency than the first clock and the second clock is supplied to the bus, the first interface section transmits a first data transfer request to the bus, receives a first acknowledge signal corresponding to the first data transfer request from the bus, and then performs a first data transfer corresponding to the first data transfer request, the second interface section transmits a second data transfer request to the bus, receives a second acknowledge signal corresponding to the second data transfer request from the bus, and then performs a second data transfer corresponding to the second data transfer request, the transmission of the first data transfer request, the reception of the first acknowledge signal, and the first data transfer are performed in one period of the first data transfer are performed in one period of the first clock, the transmission of the second data transfer request, the reception of the second acknowledge signal, and the second data transfer are performed in one period of the second clock, the first processor core transmits the first data transfer request signal to the bus at a first time, the second processor core transmits the second data transfer request signal to the bus at the first time, the bus performs the first data transfer at a second time, the bus performs the second data transfer at a third time different from the second time, the first time, the second time, and the third time are within a range of one period of the first clock, and the first time, the second time, and the third time are within a range of one period of the second clock.

16. An information processing device comprising:

a first processor core;

a second processor core; and a bus connected to both the first processor core and the second processor core, wherein the first processor core includes: a first arithmetic section for performing arithmetic operation; and a first interface section for performing input and output of data between the bus and the first arithmetic section, the second processor core includes: a second arithmetic section for performing arithmetic operation; and a second interface section for performing input and output of data between the bus and the second arithmetic section, a first clock is supplied to the first arithmetic section, a second clock is supplied to the second arithmetic section, a third clock higher in frequency than the first clock and the second clock is supplied to the bus, the first interface section transmits a first data transfer request to the bus, receives a first acknowledge signal corresponding to the first data transfer request from the bus, and then performs a first data transfer corresponding to the first data transfer request, the second interface section transmits a second data transfer request to the bus, receives a second acknowledge signal corresponding to the second data transfer request from the bus, and then performs a second data transfer corresponding to the second data transfer request, the transmission of the first data transfer request, the reception of the first acknowledge signal, and the first data transfer are performed in one period of the first data transfer are performed in one period of the first clock, the transmission of the second data transfer request, the reception of the second acknowledge signal, and the second data transfer are performed in one period of the second clock, the first interface section stores a plurality of pieces of data received from the bus to transmit the data to the first arithmetic section, and the second interface section stores a plurality of pieces of data received from the bus to transmit the data to the second arithmetic section.

17. The information processing device according to claim 11, wherein the first interface section stores a plurality of pieces of data received from the bus to transmit the data to the first arithmetic section, and the second interface section stores a plurality of pieces of data received from the bus to transmit the data to the second arithmetic section.

* * * * *